(12) United States Patent
Campos et al.

(10) Patent No.: US 7,174,344 B2
(45) Date of Patent: *Feb. 6, 2007

(54) ORTHOGONAL PARTITIONING CLUSTERING

(75) Inventors: Marcos M. Campos, Cambridge, MA (US); Boriana L. Milenova, Sommerville, MA (US)

(73) Assignee: Oracle International Corporation, Redwood, CA (US)

( * ) Notice: Subject to any disclaimer, the term of this patent is extended or adjusted under 35 U.S.C. 154(b) by 384 days.

This patent is subject to a terminal disclaimer.

(21) Appl. No.: 10/424,852

(22) Filed: Apr. 29, 2003

(65) Prior Publication Data

US 2003/0212702 A1 Nov. 13, 2003

Related U.S. Application Data

(60) Provisional application No. 60/379,118, filed on May 10, 2002.

(51) Int. Cl.
*G06F 17/00* (2006.01)

(52) U.S. Cl. ............... 707/102; 707/100; 707/101; 706/6; 702/20; 717/124; 700/31

(58) Field of Classification Search ......... 707/1–10, 707/100, 102; 706/6; 702/20; 717/124; 700/31
See application file for complete search history.

(56) References Cited

U.S. PATENT DOCUMENTS

| | | | |
|---|---|---|---|
| 6,003,029 A * | 12/1999 | Agrawal et al. ............ 707/7 |
| 6,032,146 A * | 2/2000 | Chadha et al. ............ 707/6 |
| 6,230,151 B1 * | 5/2001 | Agrawal et al. ........... 706/12 |
| 6,263,287 B1 * | 7/2001 | Zheng et al. ............ 702/20 |
| 6,263,334 B1 * | 7/2001 | Fayyad et al. ............ 707/5 |
| 6,460,045 B1 * | 10/2002 | Aboulnaga et al. ........ 707/102 |
| 6,675,164 B2 * | 1/2004 | Kamath et al. ............ 707/6 |
| 6,741,983 B1 * | 5/2004 | Birdwell et al. ............ 707/5 |
| 6,865,567 B1 * | 3/2005 | Oommen et al. ............ 707/2 |
| 2003/0176931 A1 * | 9/2003 | Pednault et al. ............ 700/31 |
| 2003/0208744 A1 * | 11/2003 | Amir et al. ............ 717/124 |
| 2004/0010497 A1 * | 1/2004 | Bradley et al. ............ 707/100 |

OTHER PUBLICATIONS

Clustering Methods for Large Data Problems by David Wishart, Posted Jun. 11, 1999.*

* cited by examiner

*Primary Examiner*—Khanh B. Pham
*Assistant Examiner*—Emeka Ebirim
(74) *Attorney, Agent, or Firm*—Bingham McCutchen LLP

(57) ABSTRACT

A database management system provides the capability to perform cluster analysis and provides improved performance in model building and data mining, good integration with the various databases throughout the enterprise, and flexible specification and adjustment of the models being built, but which provides data mining functionality that is accessible to users having limited data mining expertise and which provides reductions in development times and costs for data mining projects. The database management system for in-database clustering comprises a first data table and a second data table, each data table including a plurality of rows of data, means for building an Orthogonal Partitioning Clustering model using the first data table, and means for applying the Orthogonal Partitioning Clustering model using the second data table to generate apply output data.

56 Claims, 18 Drawing Sheets

Fig. 2

| CLUSTER | ATTRIBUTE | ACTUAL | ORIGINAL DATA | BINNED DATA (ORIGINAL COORDINATES) | BINNED DATA (BIN-SPACE COORDINATES) |
|---|---|---|---|---|---|
| C1 | A1 | 0.4 | 0.40 | 0.42 | 12.56 |
|    | A2 | 0.4 | 0.40 | 0.41 | 12.41 |
| C2 | A1 | 0.6 | 0.60 | 0.62 | 18.73 |
|    | A2 | 0.6 | 0.61 | 0.63 | 18.81 |

Fig. 5

| CLUSTER | ATTRIBUTE | ACTUAL | ORIGINAL BINNED DATA (2000 ENTRIES) | FULL BUFFER (333 ENTRIES) | D=1 (27 ENTRIES) | D=3 (71 ENTRIES) |
|---|---|---|---|---|---|---|
| C1 | A1 | 0.40 | 0.40 | 0.42 | 0.40 | 0.39 |
|  | A2 | 0.40 | 0.40 | 0.41 | 0.42 | 0.43 |
| C2 | A1 | 0.60 | 0.60 | 0.62 | 0.67 | 0.64 |
|  | A2 | 0.60 | 0.61 | 0.63 | 0.62 | 0.61 |

ORTHOGONAL PARTITIONING CLUSTERING

CROSS-REFERENCE TO RELATED APPLICATIONS

The benefit under 35 U.S.C. § 119(e) of provisional application No. 60/379,118, filed May 10, 2002, is hereby claimed.

FIELD OF THE INVENTION

The present invention relates to a system, method and computer program product for performing Orthogonal Partitioning Clustering for data mining.

BACKGROUND OF THE INVENTION

Data mining is a technique by which hidden patterns may be found in a group of data. True data mining doesn't just change the presentation of data, but actually discovers previously unknown relationships among the data. Data mining is typically implemented as software in or in association with database systems. Data mining includes several major steps. Data mining models are "trained" by processing training data and generating information that defines the model. The generated information is then deployed for use in data mining, for example, by providing predictions of future behavior based on specific past behavior.

Clustering, along with classification, regression, and market basket analysis, is one of the major data mining tasks. Clustering is a useful technique for exploring and visualizing data. It is particularly helpful in situations where one has many records of data and no idea what natural groupings might be present in the data. Ideally, one would like the data mining software to find whatever natural groupings may exist. Clustering also serves as a useful data-preprocessing step to identify homogeneous groups on which to build predictive models such as trees or neural networks. A clustering model is different from predictive models in that the outcome of the process is not guided by a known result, that is, there is no target variable. Predictive models predict values for a target variable, and an error rate between the target and predicted values can be calculated to guide model building. With clustering models, the data density itself drives the process to a final solution.

Typically, conventional data mining systems work in conjunction with a database management system, transferring data to be mined from the database management system to the data mining system for processing. As a result, these current systems tend to provide inadequate performance for large datasets. In addition, typically, a wide variety of models must be generated to meet specific, but widely different needs throughout an enterprise. A typical enterprise has a variety of different databases from which data is drawn in order to build the models. Current systems do not provide adequate integration with the various databases throughout the enterprise. Likewise, current systems provide limited flexibility in terms of specifying and adjusting the data mining to be performed to meet specific needs. In addition, a high level of expertise is typically required of a data mining user in order to actually perform useful data mining work. This high expertise requirement has led to a slow rate of adoption of data mining technology, as well as increased development times and costs for those who have adopted data mining technology.

A need arises for a technique by which cluster analysis may be performed that provides improved performance in model building and data mining, good integration with the various databases throughout the enterprise, and flexible specification and adjustment of the models being built, but which provides data mining functionality that is accessible to users having limited data mining expertise and which provides reductions in development times and costs for data mining projects.

SUMMARY OF THE INVENTION

The present invention provides the capability to perform cluster analysis and provides improved performance in model building and data mining, good integration with the various databases throughout the enterprise, and flexible specification and adjustment of the models being built, but which provides data mining functionality that is accessible to users having limited data mining expertise and which provides reductions in development times and costs for data mining projects.

In one embodiment of the present invention, a database management system for in-database clustering, comprises a first data table and a second data table, each data table including a plurality of rows of data, means for building an Orthogonal Partitioning Clustering model using the first data table, and means for applying the Orthogonal Partitioning Clustering model using the second data table to generate apply output data. The means for building an Orthogonal Partitioning Clustering model may comprise means for generating a hierarchical grid-based clustering model. The means for building an Orthogonal Partitioning Clustering model may comprise means for computing histograms for active partitions, means for finding splitting points for the active partitions, means for determining, for each active partition, whether a splitting point exists and if so, splitting the active partition at the splitting point, means for determining whether any ambiguous partitions exist, and means for determining whether any unseen data exists.

The database management system may further comprise means for loading data to be processed into a buffer. The means for loading data to be processed into a buffer may comprise means for loading a random sample of the data to be process into the buffer, if the data does not all fit into the buffer. The means for computing histograms for active partitions may comprise means for computing histograms along unidimensional projections for each active partition. The means for finding splitting points for the active partitions may comprise means for examining, for each active partition, groups of attributes and selecting a splitting plane based on density of the histogram of the active partition. The means for examining attributes and selecting a splitting plane may comprise means for selecting a splitting plane at a valley, which is a bin of low density in the histogram, between two peaks, which are bins of high density and wherein a difference between peak and valley histogram counts are statistically significant. The statistical significance may be determined according to:

$$\chi^2 = 2(\text{observed} - \text{expected})^2 \div \text{expected} \geq \chi_{\alpha,1}^2,$$

where the observed value is equal to the histogram count of the valley and the expected value is the average of the histogram counts of the valley and the lower peak. The means for determining whether any ambiguous partitions exist may comprise means for determining, for each active partition for which no splitting point exists, whether a splitting point would have existed at a lower confidence level of statistical significance.

The database management system may further comprise means for determining frozen partitions, wherein a frozen partition is an partition with no splitting point and which is not ambiguous. The means for loading data to be processed into a buffer may comprise means for identifying data in the buffer that belongs to a frozen partition, means for actively sampling the first data table to identify data to be loaded into the buffer, and means for replacing the data in the buffer that belongs to the frozen partition with the identified data to be loaded into the buffer. The means for actively sampling the first data table to identify data to be loaded into the buffer may comprise means for determining an area of the model that would be improved by additional training based corresponding to the ambiguous partition. The means for examining attributes and selecting a splitting plane may comprise means for selecting two largest bins in the histogram and for selecting a splitting plane between the two largest bins.

The database management system may further comprise means for determining frozen partitions, wherein a frozen partition is an partition with no splitting point and which is not ambiguous. The means for loading data to be processed into a buffer may comprise means for identifying data in the buffer that belongs to a frozen partition, means for actively sampling the first data table to identify data to be loaded into the buffer, and means for replacing the data in the buffer that belongs to the frozen partition with the identified data to be loaded into the buffer. The means for actively sampling the first data table to identify data to be loaded into the buffer may comprise means for determining an area of the model that would be improved by additional training based corresponding to the ambiguous partition.

BRIEF DESCRIPTION OF THE DRAWINGS

The details of the present invention, both as to its structure and operation, can best be understood by referring to the accompanying drawings, in which like reference numbers and designations refer to like elements.

FIG. 2 is an exemplary table listing coordinates for estimated cluster centers.

FIG. 5 is an exemplary table illustrating results of applying K-Means to the distribution shown in FIG. 3 with different buffer sizes.

DETAILED DESCRIPTION OF THE PREFERRED EMBODIMENT

Concepts

Clustering

A general view of clustering places it in the framework of density estimation. From this perspective, clustering can be viewed as identifying the dense regions in the input data or finding components (which can overlap) of the density function that when combined provide a good approximation of the original density function. For example, a Gaussian-mixture clustering model attempts to find a set of (overlapping) Gaussian components that approximate well the target density function. These components implicitly partition the space into regions where the contribution of a single component dominates. It is common, in this context, to identify each component as a cluster. For cases where the density function is not a mixture of Gaussian components the mapping of components to clusters breaks down, even though the mixture model still approximate the density very well.

Clustering can be defined as finding a set (usually small) of components of the density function that provide a good approximation (summary) of the density. If the components overlap (mix) then we have soft assignment of data points to clusters (e.g., probabilistic or fuzzy clustering). If the clusters are organized into a hierarchical structure then clustering implicitly defines a taxonomy for the data.

Clustering in Bin-space

Figure 1A:
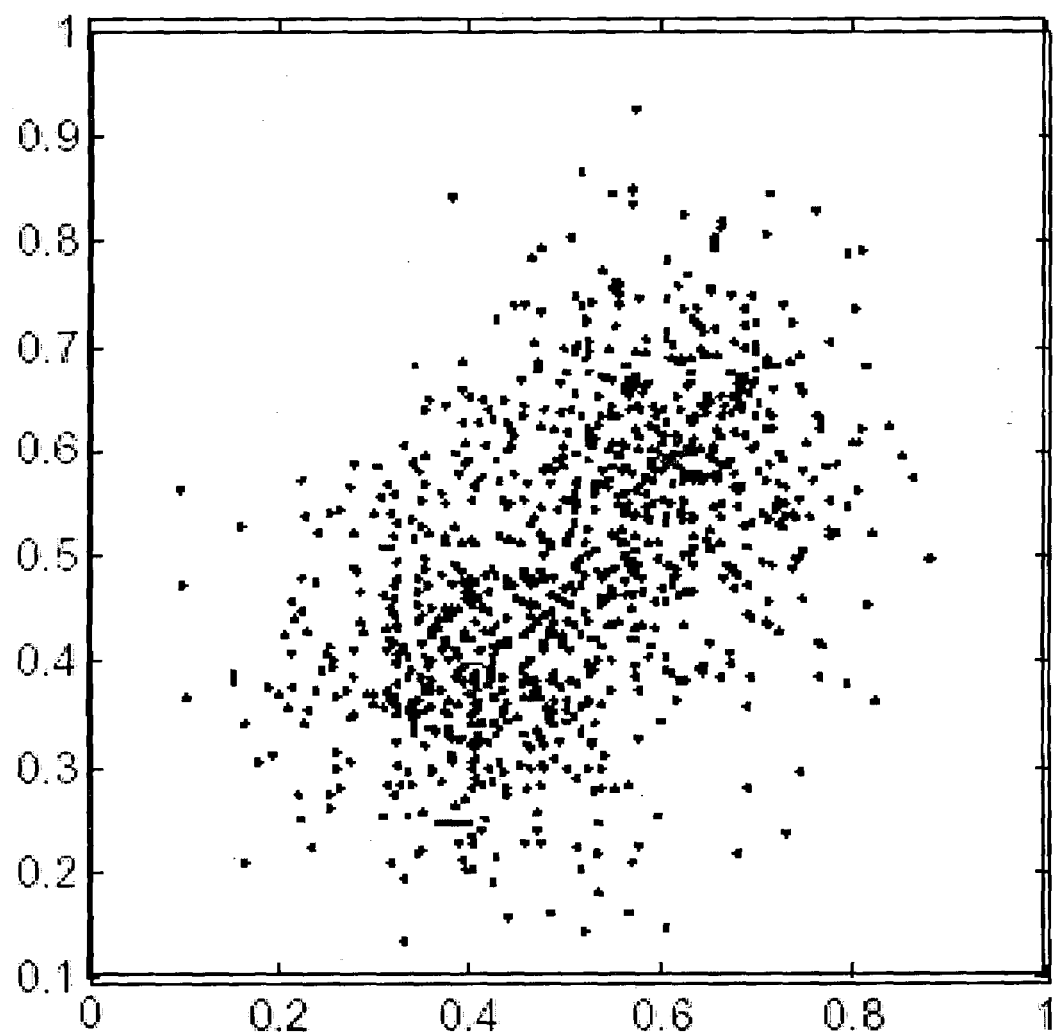
FIG. 1a is an exemplary diagram showing a two-dimensional distribution of input data.
Figure 1B:
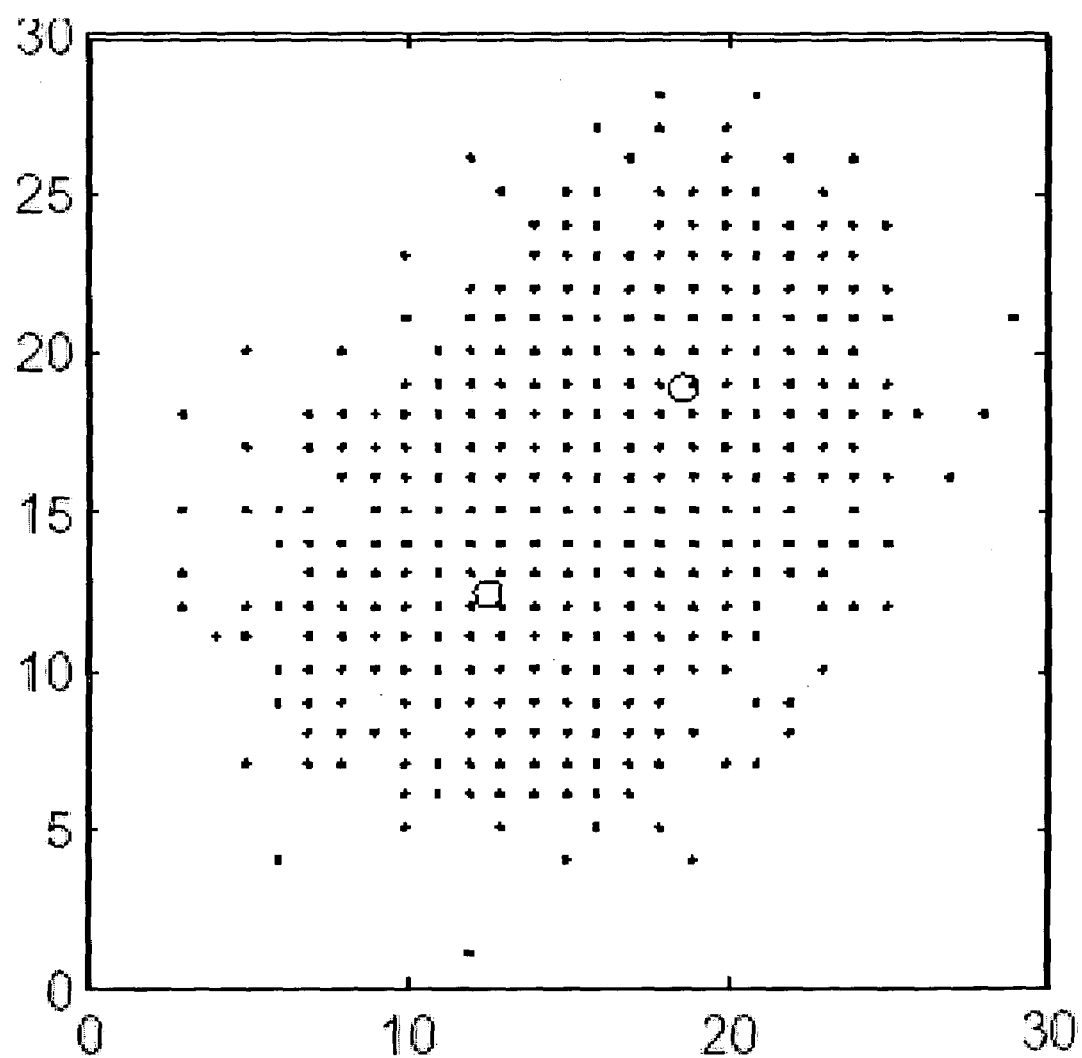
FIG. 1b is an exemplary diagram showing a two-dimensional distribution of input data in bin-space where each attribute has been binned.

The processes utilized by the present invention may work with binned or unbinned data. FIG. 1a shows a two-dimensional distribution of unbinned data, while FIG. 1b shows a distribution of the same data in bin-space where each attribute has been binned into 30 bins. Each cell in the bin-space representation contains many of the original data points. It also shows the centers (circles) of the clusters computed using the K-Means algorithm. The coordinates for the estimated cluster centers are listed in the exemplary table shown in FIG. 2.

Hierarchical Partitioning of the Data

A quick way of approximating the input density function is to build a hierarchical partitioning of the data using a kd-tree. Each leaf of the tree will own a subset of the input data points. There are many advantages in constructing a tree representation of the density, to list a few:

It is inexpensive to construct and can be used for supporting many complex algorithms, such as Bayesian or probabilistic models.

It provides a coarse taxonomy of the input data.

It can significantly speed up building clustering models. It is very expensive to run distance-based clustering algorithms in large datasets with many attributes. The tree provides a summary of the density that can be used to train clustering algorithms instead of using the original data. Fewer points translate into faster training.

It introduces a gradual form of dimensionality reduction. Instead of the global feature selection commonly used this is a local feature selection. Attributes that are not relevant for some areas of the input space become very infrequent. The tree decimates the data very quickly and many attributes become irrelevant in each partition.

Building a Tree to Summarize the Density

Figure 3:
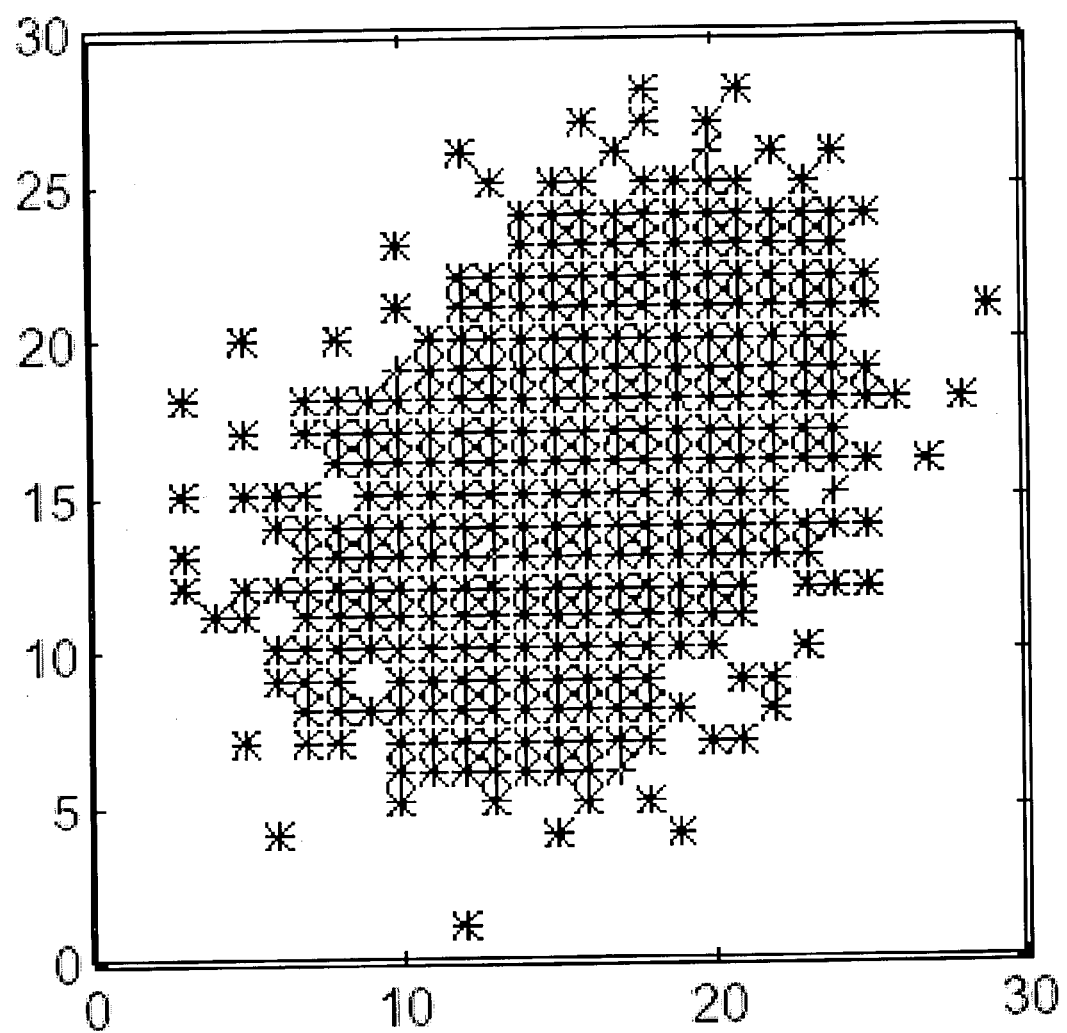
FIG. 3 is an exemplary diagram showing compression achieved by using only one entry in the buffer per cell in bin-space.

While building a tree the data for storing the tree is kept in memory in a buffer. Each entry in the buffer is assigned to as single leaf node in the tree. Each entry has also a count associated with it. Because the tree works with binned data many input data points will have the same coordinates in bin-space and can be represented by a single entry in the buffer. This provides a natural summary of the data and some compression. FIG. 3 shows the compression achieved by using only one entry in the buffer per cell in bin-space. Only 333 cells, out of 900 possible, are needed to summarize the initial 2000 points in FIG. 1a. However, for sparse data this scheme alone won't achieve much compression of the input data. The following strategy is used to build the tree:

Read the data for a caseId from the input source.
Find the leaf to which the caseId belongs.
Search amongst the entries in the buffer assigned to the winning leaf for the coordinates of the current data point:
  If the data point already exist increase the count for the data point in the buffer,
  Otherwise add a new entry to the buffer for the current data point with a count of one.
When a caseId is assigned to a node the histograms kept at the node for each attribute are updated.
When the number of entries assigned to a node reaches a pre-specified threshold the node is split and its buffer entries divided among its child nodes. The node is split along the attribute with the highest entropy. For high cardinality attributes we can split on the top K most frequent values and bundle the rest in an Others partition.
If the buffer fills up no more data is read into the tree.
After the buffer is filled up or all the data is read into the tree, it is still possible to continue growing the tree by using a smaller threshold to control splitting.

The use of a kd-tree in clustering has already been proposed. The approach proposed here is different from that work in that it uses binned or unbinned data, introduces data compression while building the tree, and it splits on all values of a given attribute simultaneously.

Scaling to Large Datasets with Buffer Compression

Although the tree construction described in the previous section already provides some degree of data compression that scheme works well only if the data is dense. When the data is sparse each unique cell in the grid will have very few points. However there might be many subspaces, which are dense. This fact can be used to achieve further compression of the data by combining multiple cells in the buffer in a single entry or summary. This can be implemented during the tree construction step by defining a cell as the hypercube defined by B bins along each dimension. The parameter B controls the degree of compression. The tree construction scheme described in the previous section assumed B=1.

Figure 4A:
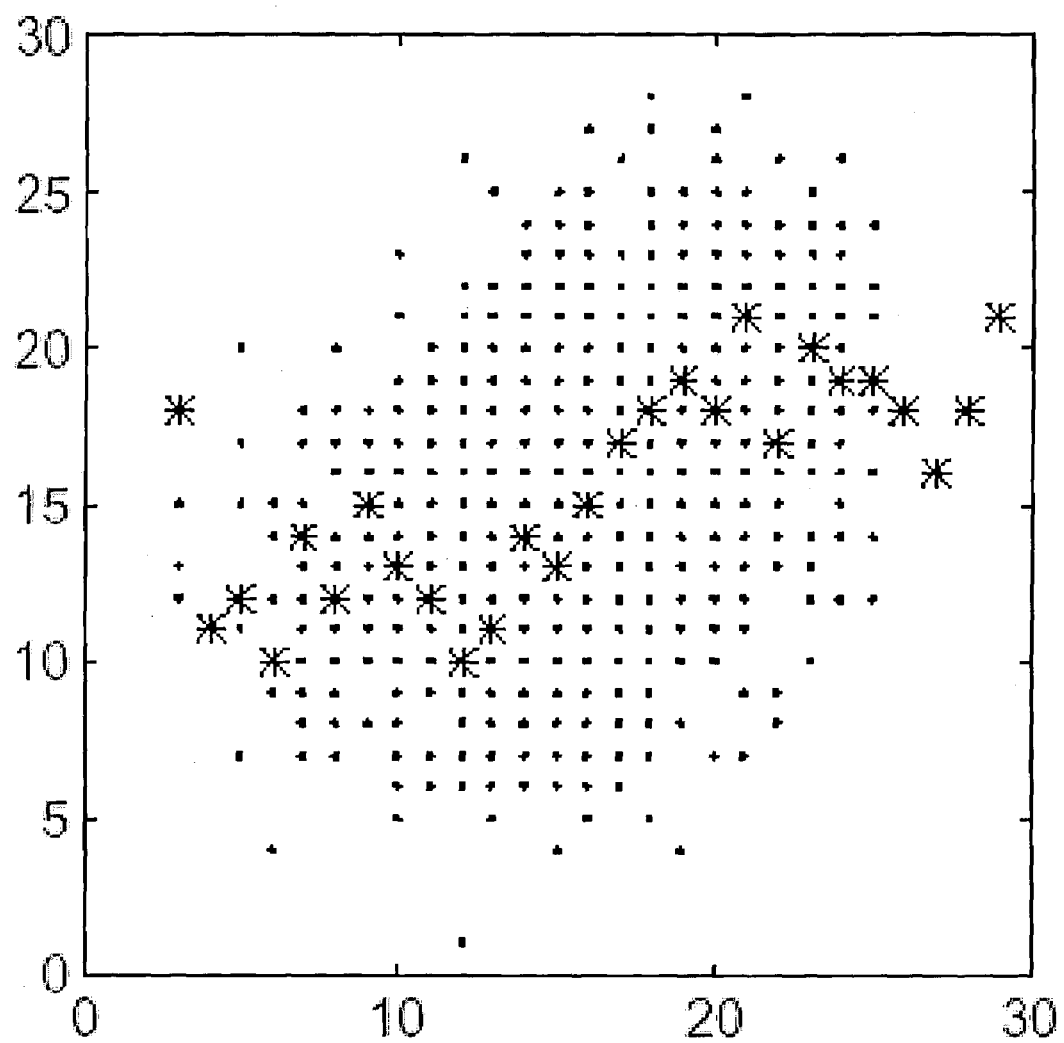
FIG. 4a is an exemplary diagram showing a compressed buffer.
Figure 4B:
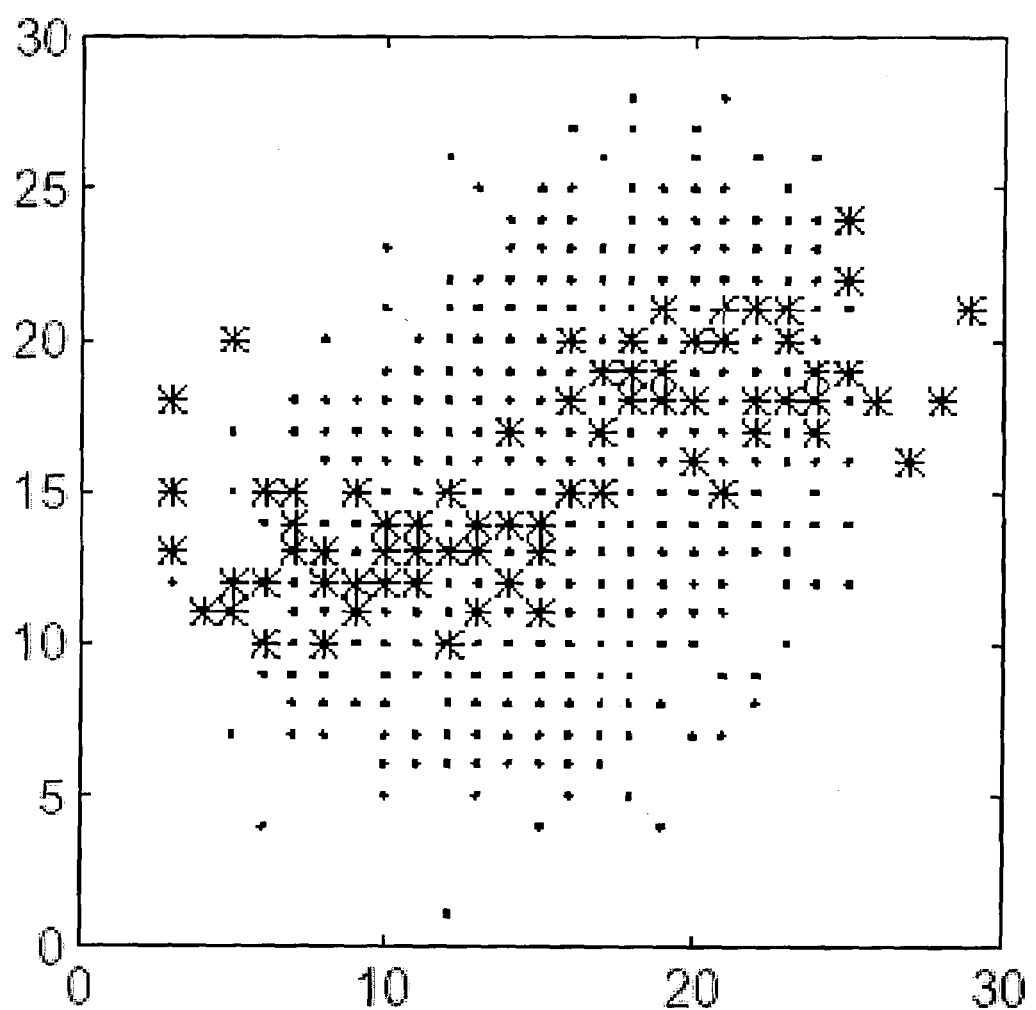
FIG. 4b is an exemplary diagram showing a compressed buffer.

FIGS. 4a and 4b shows the impact of buffer compression on the representation of the density. The uncompressed buffer (FIG. 3) has 333 entries. For this example there is one leaf for each value of the horizontal attribute A1. FIG. 4a displays the buffer for one level of compression. After compression the buffer has 27 entries (three A1 bins have zero data). FIG. 4b displays the buffer for another level of compression. In this case the buffer has 71 entries.

The method described above is an innovative approach that should be faster and more efficient than conventional approaches. It can also easily handle mixed data, which is not addressed by conventional approaches.

Clustering with Summaries

For many applications the partition of the input data provided by the kd-tree described above is sufficient. However, other applications require more sophisticated clustering algorithms. As discussed in the previous section, buffer compression provides the means to scale density summarization to large datasets with limited memory while performing a single scan of the input table. The summaries created by compressing the buffer can then be used to train a variety of clustering models (e.g., K-Means, and mixture models).

Clustering models may be trained in a variety of ways. For example:

K-means models may be trained by creating the tree and then running the clustering model on the statistics stored in the leaves.
Other types of models may be trained by reading a portion of the dataset and building the tree using that data. The clustering model is trained using the data. More data is then read and the models are trained using that data. However, not all the data is used to train the model. Rather, active sampling is performed in which areas of the model that would be improved by additional training are determined. Only data that relates to those areas of the model are used to performed additional training. Data that relates to areas of the model that would not be improved by additional training is not used to train the model. The process is repeated until either all the rows in the dataset have been read or the buffer cannot receive more data.

The above two strategies can be used to scale a variety of clustering algorithms to handle large datasets with a large number of attributes. The first of the above two strategies is exemplified below for K-Means, K- and mixture models. The second strategy is exemplified later on by O-Cluster.

The hierarchical nature of the buffer can also be used to further speed up the training of clustering models. This is especially useful for training incremental models where the number of clusters is gradually increased.

K-Means

K-Means has two steps:

Assign data points to clusters. That is, assign each of the rows in the buffer to the nearest cluster.
Update the centroids (the weight vector associated with each cluster)

The assignment step requires computing a distance metric to compute the distance between an input and each of the centroids. The distance metric most used is the Euclidean metric:

$$d_j^n(I) = \sum_i d_{ij}^n(I), \text{ where } d_{ij}^n(I) = (I_i - W_i^j)^2,$$

where $d_j^n(I)$ is the distance between input I and the $j^{th}$ centroid, i indexes the input attributes, and $w_i^j$ is the $i^{th}$ coordinate of the $j^{th}$ centroid. The update of the centroids is done by replacing the current centroid by the mean of the data points assigned to the cluster:

$$W_i^j = \frac{\sum_{l=1}^{|A^j|} A_{l_i}^j}{|A^j|},$$

where $A^j$ is the set of data points assigned to cluster j and $A_l^j$ is the is the $i^{th}$ attribute of the point $A_l^j$ in $A^j$. When working with summaries, each data point contributes with a different weight to the computation of the new centroid. The modified formula becomes:

$$W_i^j = \frac{\sum_{l=1}^{|A^j|} C_l^j A_{l_i}^j}{\sum_{l=1}^{|A^j|} C_l^j},$$

where $A^j$ is the set of summaries and points assigned to cluster j, $C_l^j$ is the number of points in summary or point $A_l^j$.

The results of applying K-Means to the distribution in FIG. 3 with a different buffer are illustrated in the exemplary table shown in FIG. 5. The coordinates for the centroids have to be transformed back to the original scale.

Mixture Models (EM)

Mixture models attempt to approximate an input density with a fixed number of components density distributions. The number and the types of the component distributions are specified beforehand. Training of this type of model usually uses the EM algorithm. This is an iterative process that has two main steps:
  Assign data points to components according to the probability they belong to the component distributions.
  Update the parameters of the component distributions using the points assigned to the component.

When working with summaries, the summaries are assigned to the components according to the probability that they belong to each component. A summary contributes to the update of the parameters of each component according to the product of the summary's count and the probability of belonging to the distribution.

Cluster Description and Interpretability

Figure 6:
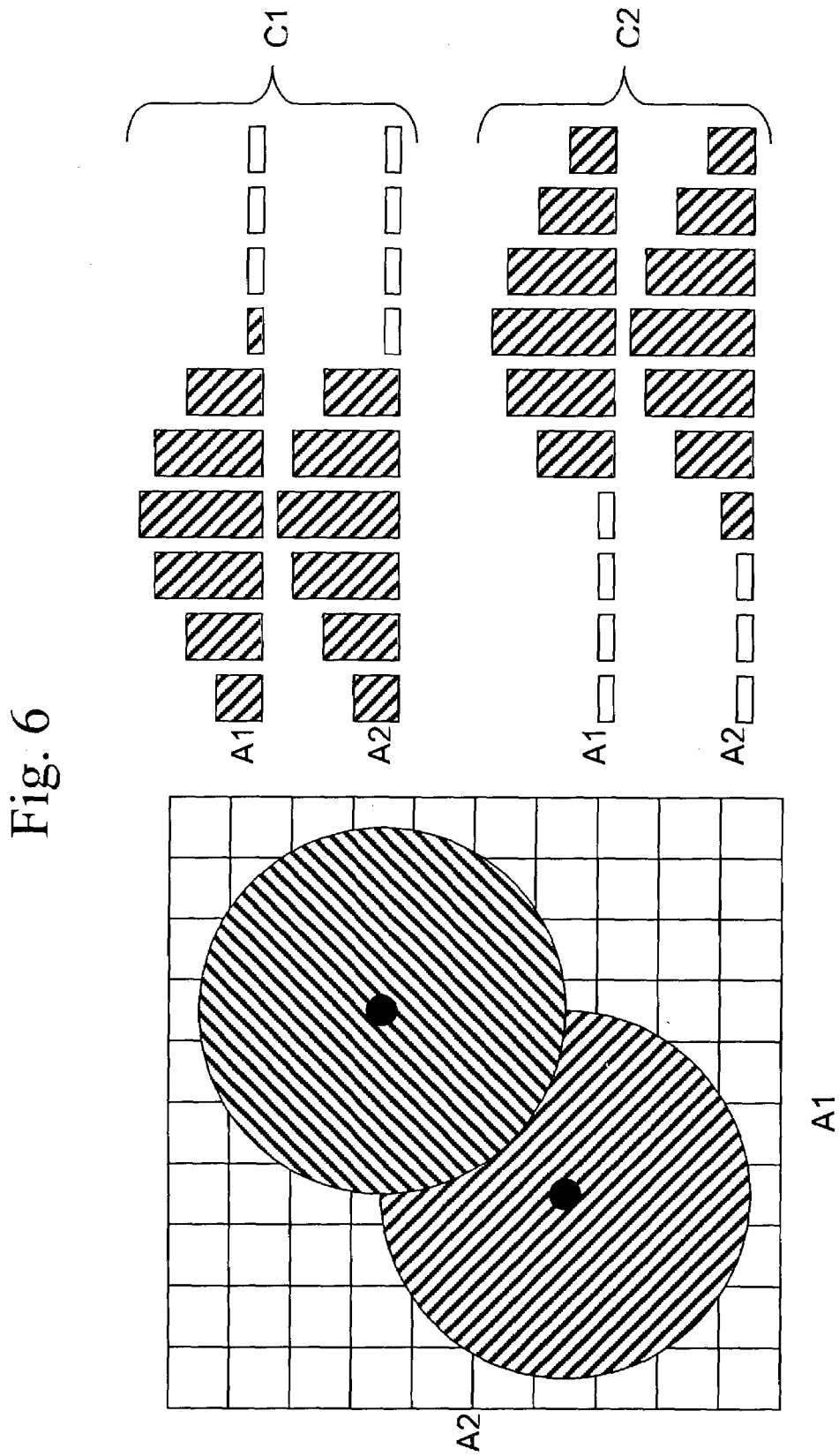
FIG. 6 is an exemplary diagram illustrating centroids of clusters estimated using K-Means.

The hierarchical partition described above provides a summary of the input distribution that can be described by rules of the type:
  Age>=20 AND Age<=30 AND Color IN {'red', 'yellow'}→C1
  where Age and Color are attributes and C1 is a cluster index or label It is possible to extract rules of the type described above for clusters uncovered by a clustering model. In this case each cluster will have a histogram associated with it. Using these histograms we can extract a hyperbox that captures most of the data associated with that cluster. Hyperboxes have the nice feature that they can be described by a set of rules. For numeric attributes the hyperbox is defined around the mean. For categorical attributes the hyperbox includes the attribute values with the largest counts so that the sum of their counts accounts for a large percentage of the total count for the cluster. This is illustrated in FIG. 6 where the centroids of the two clusters were estimated using K-Means. The histograms on the right side are used to define the hyperboxes (darker squares) on the left side of the figure. The two hyperboxes are captured by the following rules:

$A1<8$ AND $A2<7$->$C1$ $A1>4$ AND $A2>3$->$C2$

Other pieces of helpful information for complementing the description of each cluster are:
  The distribution of values for each attribute (the histograms)
  The mean and mode of these distributions.

Probabilistic Models

The histograms on the leaves of the tree partitioning described above can be used to define a collection of local Naïve Bayes models, one per leaf. These models can be easily persisted in tables and scored using the same scoring queries as those used by Naïve Bayes modeling. The combination of these Naïve Bayes models constitutes a Bayesian Network approximation of the input density function that can be used in a variety of modeling tasks. For example, it can be used to generate rules on the fly of which products are most correlated with a given basket of products. It can also treat both presence and absence of information.

The estimate of the density using the histograms at the leaf level may have very high variance due to the lack of enough data at the leaves. To minimize this we can use data shrinkage to interpolate the histograms using the counts at the higher levels to reduce the variance at the leaf level. This approach would make it possible to generalize across tree boundaries.

It is also possible to build probabilistic models by training more sophisticated models, such as EM-based mixture models, on the data summary created by the tree partitioning scheme.

Support to Supervised Models

The concepts described in the previous sections can also be easily adapted to implement fast algorithms for creating a variety of supervised models, for example:
  Bayesian networks
  KNN
  Radial basis functions
  Wavelet networks Concepts The present invention provides a number of advantages, such as:
1. A special hierarchical approximation of the data that uses binned or unbinned data and offers natural compression of the data.
2. A novel fast data summarization approach to scale clustering algorithms to large datasets.
3. Clustering using a hierarchical approximation of the data.
4. Novel implementations of many traditional clustering models:
  K-Means
  Mixture models (EM)
5. Novel cluster description technique.
6. Novel approach to create Bayesian networks.

Exemplary Software Modules Design

Figure 7:
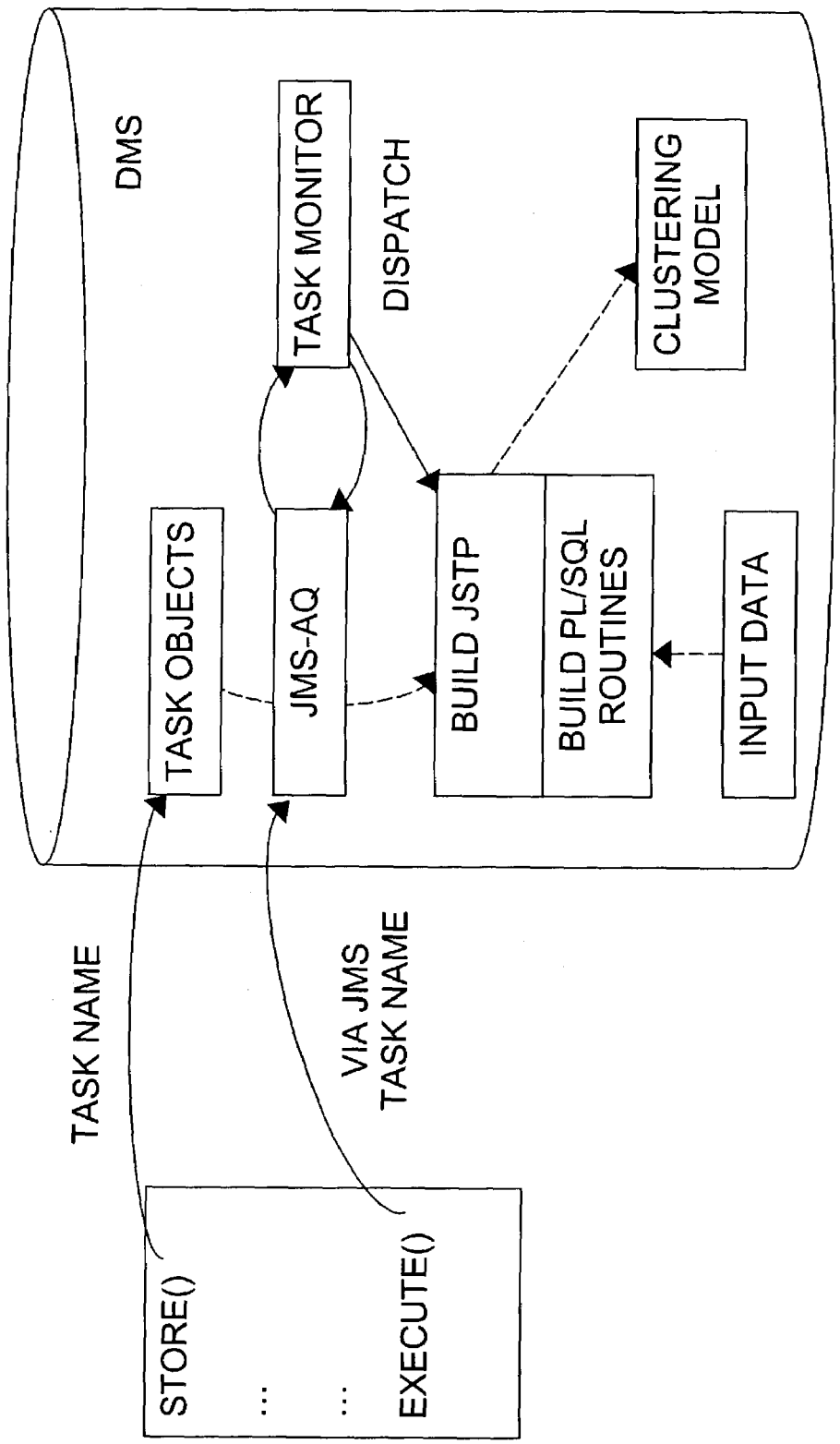
FIG. 7 is an exemplary diagram illustrating a clustering build task framework.
Figure 8:
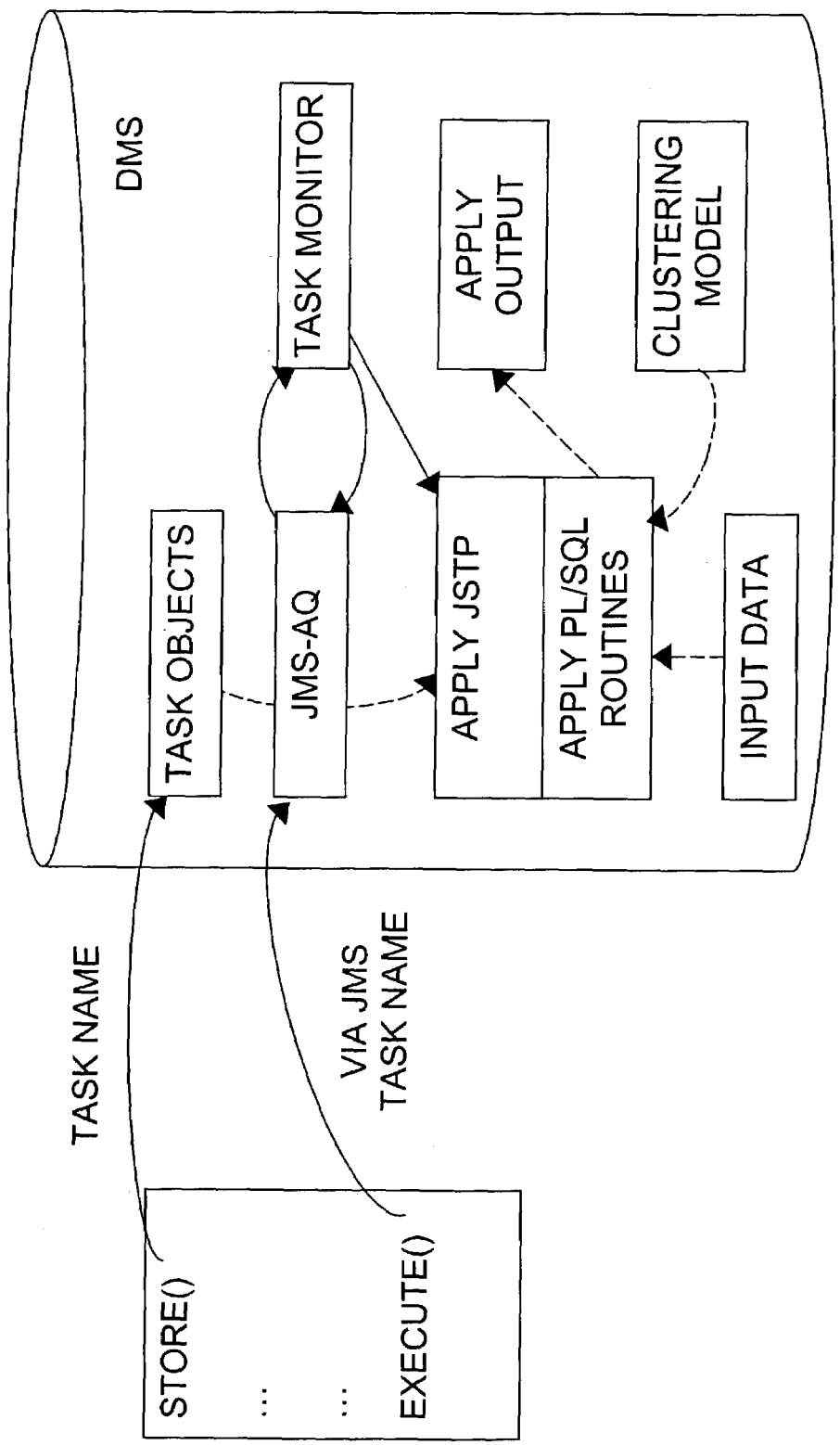
FIG. 8 is an exemplary diagram illustrating a clustering apply task framework.

An example of a clustering build task framework is shown in FIG. 7. An example of a clustering apply task framework is shown in FIG. 8.

K-Means Build Module

Description

Builds a center-based clustering model using the K-Means algorithm. The K-Means algorithm is suitable for numerical data. The produced model is hierarchical and represents a binary tree.

If the number of rows in the training dataset is greater than the K-Means buffer size, the build module initially invokes the data summarization module. Subsequently, it invokes the K-Means hierarchical module that in turn calls repeatedly the K-Means core module.

After the actual clustering the build module calls the generate rules and generate probabilistic model modules to generate the set of rules associated with the clustering model and the Naïve Bayes model used for scoring.

If summarization is engaged it is necessary to extract the relevant information produced by the data summarization step. For K-Means, it is necessary to extract the mean value of each attribute.

K-Means Core Module

Figure 9:
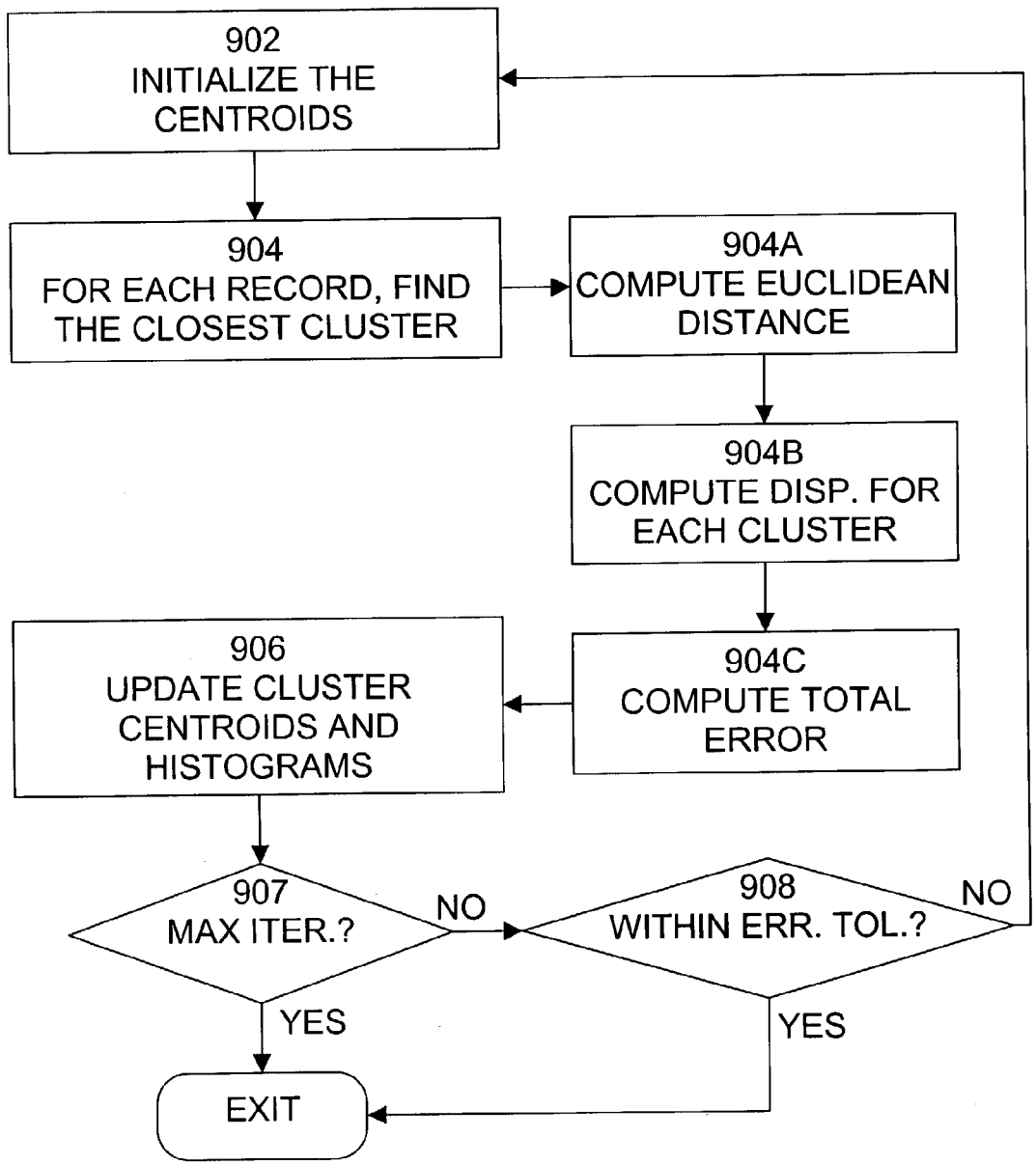
FIG. 9 is an exemplary flow diagram illustrating a core K-Means process.

An exemplary flow diagram of a core K-Means process 900 is shown in FIG. 9. Process 900 begins with step 902, in which the centroids of the clusters are initialized. The centroids should be seeded with the centroid of all points to be partitioned (that is, the centroid of the parent cluster). To break the symmetry, an attribute needs to be perturbed. Select the attribute with highest variance. K-Means works with continuous attributes. The present algorithm assumes that the data are always partitioned into two clusters at a time. Therefore, one of the clusters can be seeded with the parent centroid. The other cluster should be perturbed on the attribute with maximum variance. The selected attribute should be perturbed by adding a small value (epsilon).

In step 904, for each record, the closest cluster to the data in the record is found. Step 904 includes sub-steps 904A–C. In sub-step 904A, the Euclidean distance between each record and each centroid is computed and a winning cluster for each record is selected. In step 904B, a dispersion for each cluster (average distance of cluster members to centroid) is computed. In step 904C, a total error (sum of distance between each record and cluster center) is computed.

In step 906, cluster centroids and histograms are updated on the basis of new record assignments. In step 907, if the maximum number of iterations is reached, process 900 exits. Otherwise, process 900 continues with step 908, in which, if error tolerance is selected as a stopping criterion, the current total error is compared with the total error from the previous iteration. If the difference is within the error tolerance, process 900 exits. Otherwise, process 900 continues, loops back to step 902 and performs another iteration.

K-Means Hierarchical Module

Figure 10:
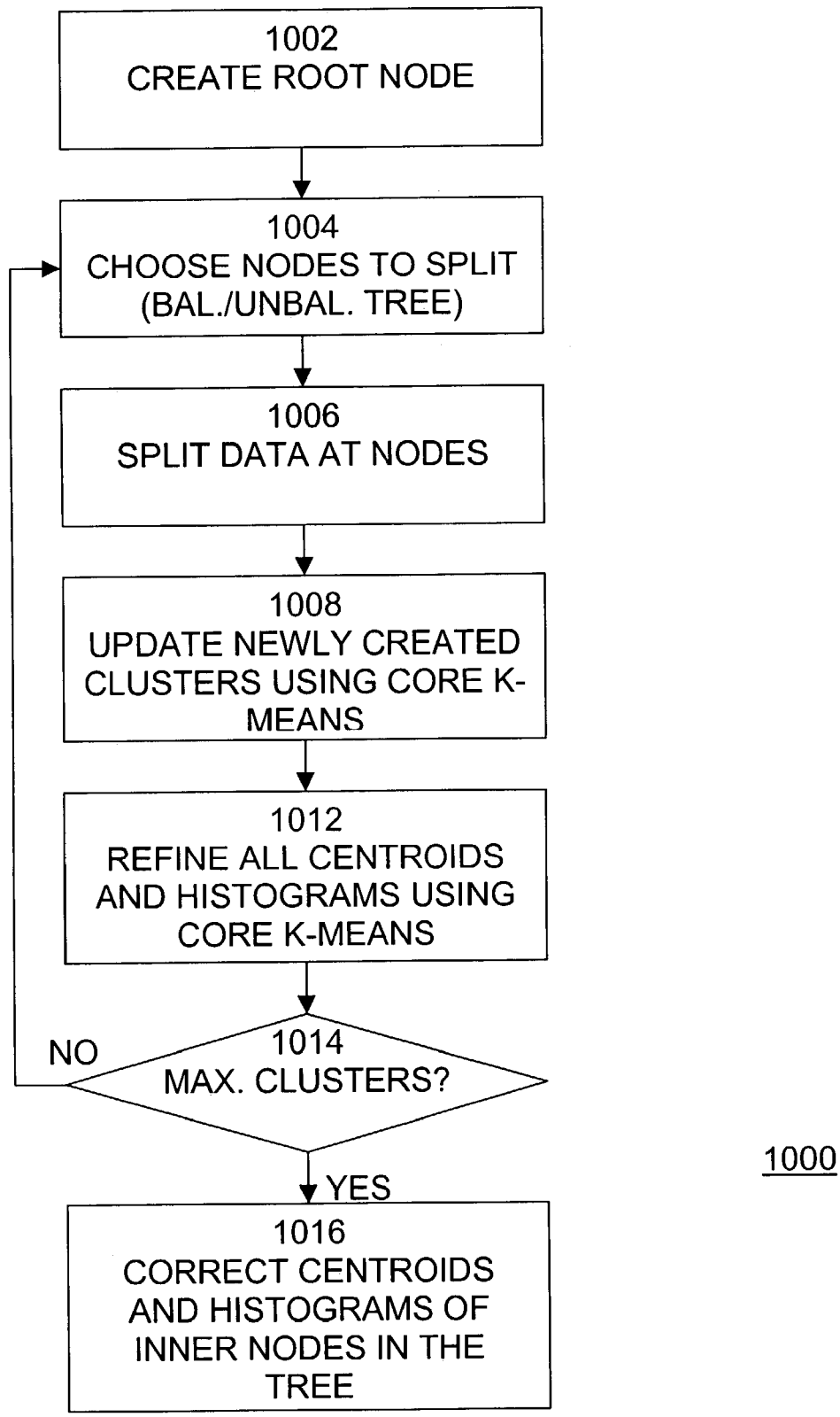
FIG. 10 is an exemplary flow diagram illustrating hierarchical K-Means process.

An exemplary flow diagram of a hierarchical K-Means process 1000 is shown in FIG. 10. The hierarchical process builds a binary tree of clusters. To find appropriate splits, the tree build calls the core K-Means process 900. Process 1000 begins with step 1002, in which a root node that contains all training data in the buffer is created. In step 1004, the nodes to be split are chosen. If a balanced tree is being built, the process splits on all nodes in a level if the resulting number of leaves does not exceed the maximum number of leaves (clusters) allowed. If splitting on all nodes in a level is not possible, the nodes are ranked by their dispersion and as many as possible are split without exceeding the maximum number of clusters allowed. If an unbalanced tree is being built, the node with the largest dispersion is split. If all nodes have zero dispersion (1 point per cluster), process 1000 exits.

In step 1006, for each node to be split, the K-Means process is called to split the data associated into two clusters. In step 1008, newly created clusters are updated using the core K-means process. In particular, the centroids and histograms of the clusters are updated based on the data that is assigned to each cluster. In addition, the error (dispersion) and number of points may be updated.

In step 1012, all centroids and histograms are refined by training on all data records. That is, the core K-Means process is rerun with all data points. In step 1014, steps 1004 to 1012 are repeated until the leaf node number becomes equal to the maximum number of clusters. In step 1016, the parent centroids and histograms of the inner nodes in the tree are corrected. The process starts at the leaf nodes—adding the histograms and computing a new centroid for each parent node. The process propagates up the tree until the root node is reached.

Final Histogram Generation

Once the clustering tree is constructed, in order to facilitate rule extraction, it is necessary to create histograms of the data records associated with each cluster. In order to achieve the best possible level of resolution, the original histograms produced by the data summarization step are used.

The process starts at the tree leaves. All cells (as generated by the summarization step) associated with a leaf contribute to a composite histogram for each individual cluster. Then the leave histograms can be added up to produce a parent histogram. This process continues until the root leaf is reached.

The clustering model is persisted in two tables in the database. Extra information for rules and Naïve Bayes models are also stored in three tables. K-Means uses the Naïve Bayes apply modules.

Orthogonal Partitioning Clustering (O-Cluster) Build Module

Description

The O-Cluster build module creates a hierarchical grid-based clustering model. The resulting clusters define dense areas in the attribute space and are described by intervals along the attribute axes and the corresponding histograms for those intervals. These clusters are subsequently used by the Rule and Naïve Bayes generation modules. The O-Cluster module can be also used in data summarization mode. When in summarization mode, O-Cluster produces 'heavy' data points that represent areas in the attribute space. These points can be clustered by the K-Means algorithm.

The objective of O-Cluster is to identify areas of high density in the data and separate them into individual clusters. The algorithm looks for splitting points along axis-parallel projections that would produce cleanly separable and preferably balanced clusters. The algorithm operates recursively by creating a binary tree hierarchy. The number of leaf clusters is determined automatically and does not need to be specified in advance. The topology of the hierarchy, along with its splitting predicates, can be used to gain insights into the clustering solution. The following sections describe the partitioning strategy used with numeric, categorical, and mixed values, outline the active sampling method employed by O-Cluster, and summarize the main processing stages of the algorithm.

Numeric Values

Figure 15:
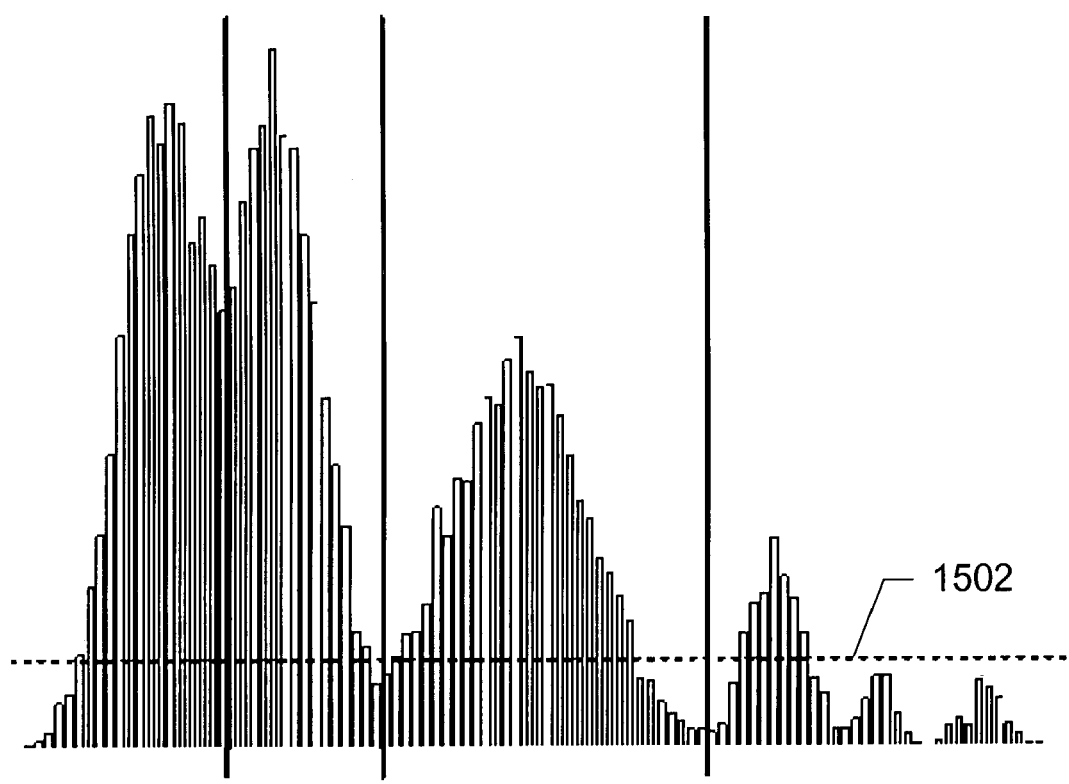
FIG. 15 is an exemplary illustration of numeric attribute splitting points identified in a one dimensional histogram.

O-Cluster computes uni-dimensional histograms along individual input attributes. For each histogram, O-Cluster attempts to find the 'best' valid cutting plane, if any exist. A valid cutting plane passes through a bin of low density (a valley) in the histogram. Additionally, the bin of low density should have bins of high density (peaks) on each side. O-Cluster attempts to find a pair of peaks with a valley between them where the difference between the peak and valley histogram counts is statistically significant. Statistical significance is tested using a standard $\chi^2$ test:

$$\chi=2(observed-expected)^2 \div expected \geq \chi_{\alpha,1}^2,$$

where the observed value is equal to the histogram count of the valley and the expected value is the average of the histogram counts of the valley and the lower peak. A 95% confidence level $\chi_{0.05,1}^2=3.843$ has been shown to produce reliable results. Since this test can produce multiple splitting points, O-Cluster chooses the one where the valley has the lowest histogram count and thus the cutting plane would go through the bin with lowest density. Alternatively, or in the case of a tie, the algorithm can favor splitting points that would produce balanced partitions. It is sometimes desirable to prevent the separation of clusters with small peak density. This can be accomplished by introducing a baseline sensitivity level that excludes peaks below this count. It should be noted that with numeric attributes, sensitivity ($\rho$) is an optional parameter that is used solely for filtering of the splitting point candidates. Sensitivity is a parameter in the [0, 1] range that is inversely proportional to the minimum count required for a histogram peak. A value of 0 corresponds to the global uniform level per attribute. The global uniform level reflects the average histogram count that would have been observed if the data points in the buffer were drawn from a uniform distribution. A value of 0.5 sets the minimum histogram count for a peak to 50% of the global uniform level. A value of 1 removes the restrictions on peak histogram counts and the splitting point identification relies solely on the $\chi^2$ test. A default value of 0.5 usually works satisfactorily. Referring briefly to FIG. 15, numeric attribute splitting points identified in a one dimensional histogram is illustrated. This example shows the use of a sensitivity level 1502.

It is desirable to compute histograms that provide good resolution but also have data artifacts smoothed out. O-Cluster is robust with respect to different binning strategies as long as the histograms do not significantly undersmooth or oversmooth the distribution density. Data sets with low number of records would require coarser binning and some resolution may potentially be lost. Large data sets have the advantage of supporting the computation of detailed histograms with good resolution.

Categorical Values

Figure 16:
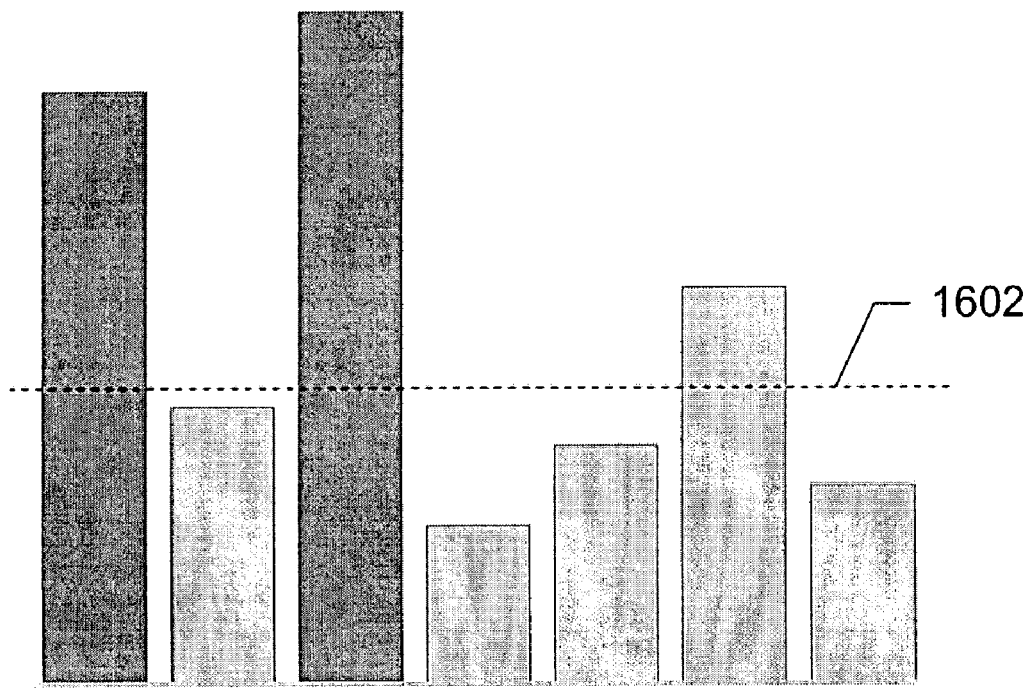
FIG. 16 is an exemplary illustration of a categorical attribute histogram.

Categorical values do not have an intrinsic order associated with them. Therefore it is impossible to apply the notion of histogram peaks and valleys as in the numeric case. The counts of individual values form a histogram and bins with large counts can be interpreted as regions with high density. The clustering objective is to separate these high density areas and effectively decrease the entropy of the data. O-Cluster identifies the histogram with highest entropy among the individual projections. For simplicity, we approximate the entropy measure as the number of bins above sensitivity level p(as defined above). O-Cluster places the two largest bins into separate partitions, thereby creating a splitting predicate. The remainder of the bins can be assigned randomly to the two resulting partitions. If these bins have low counts, they would not be able to influence O-Cluster's solution after the split. The leaf clusters are described in terms of their histograms and/or modes and small bins are considered uninformative. If more than two bins have high counts in a histogram, subsequent splits would separate them into individual partitions. To avoid rapid data decimation, O-Cluster creates a binary tree rather than one where large bins fan out into individual branches. The top down approach used by O-Cluster discovers co-occurrences of values and each leaf encodes dense cells in a subspace defined by the splits in O-Cluster's hierarchy. Referring briefly to FIG. 16, a categorical attribute histogram is shown. The two largest bins (colored dark gray) will seed the two new partitions. Again, the sensitivity level 1602 is shown.

When histograms are tied on the largest number of bins above the sensitivity level, O-Cluster favors the histogram where the top two bins have higher counts. Since the splits are binary, the optimal case would have all the partition data points equally distributed between these two top bins. We numerically quantify the suboptimality of the split as the difference between the count of the lower of the two peaks and the count of half of the total number of points in the partition.

Mixed Numeric and Categorical Values

O-Cluster searches for the 'best' splitting plane for numeric and categorical attributes separately. Then it compares two measures of density: histogram count of the valley bin in the numeric split and the suboptimality of the categorical split. The algorithm chooses the split with lower density.

Active Sampling

O-Cluster uses an active sampling mechanism to handle databases that do not fit in memory. The algorithm operates on a data buffer of a limited size. After processing an initial random sample, O-Cluster identifies data records that are of no further interest. Such records belong to 'frozen' partitions where further splitting is highly unlikely. These records are replaced with examples from 'ambiguous' regions where further information (additional data points) is needed to find good splitting planes and continue partitioning. A partition is considered ambiguous if a valid split can only be found at a lower confidence level. For a numeric attribute, if the difference between the lower peak and the valley is significant at the 90% level ($\chi_{0.1,1}^2=2.706$), but not at the default 95% level, the partition is considered ambiguous. Analogously, for a categorical attribute, if the counts of at least two bins are above the sensitivity level but not to a significant degree (at the default 95% confidence level), the partition is labeled ambiguous.

Records associated with frozen partitions are marked for deletion from the buffer. They are replaced with records belonging to ambiguous partitions. The histograms of the ambiguous partitions are updated and splitting points are reevaluated.

Figure 11:
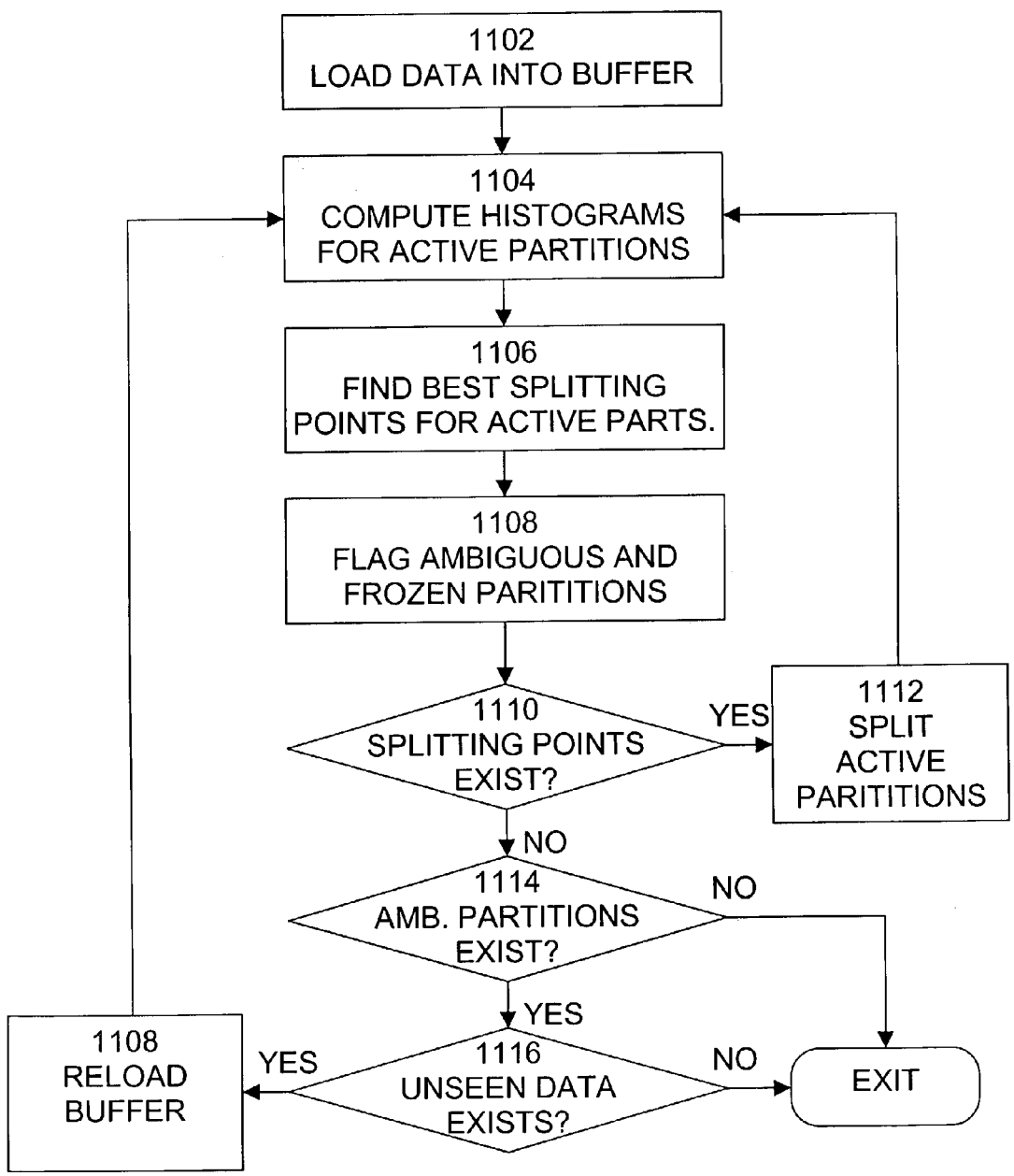
FIG. 11 is an exemplary flow diagram illustrating an O-Cluster process.

An exemplary flow diagram of an O-Cluster process 1100 is shown in FIG. 11. Process 1100 begins with step 1102, in which data is loaded into the buffer. If the entire data set does not fit in the buffer, a random sample is used. O-Cluster process-1100 assigns all points from the initial buffer to a single active root partition. In step 1104, histograms are computed for the active partitions. The goal is to compute histograms along the orthogonal unidimensional projections for each active partition. Any partition that represents a leaf in the clustering hierarchy and is not explicitly marked ambiguous or 'frozen' is considered active.

In step 1106, the best splitting points for the active partitions are found. For each histogram, O-Cluster process 1100 attempts to find the 'best' valid cutting plane, if any exist. The algorithm examines separately the groups of numeric and categorical attributes and selects the best splitting plane. In step 1108, ambiguous and frozen partitions are flagged. If no valid splitting points are found in a partition, O-Cluster process 1100 checks whether the $\chi^2$ test would have found a valid splitting point at a lower confidence level. If that is the case, the current partition is considered ambiguous. More data points are needed to establish the quality of the splitting point. If no splitting points were found and there is no ambiguity, the partition can be marked as 'frozen' and the records associated with it marked for deletion from the buffer.

In step 1110, it is determined whether valid splitting points (separators) exist. If, in step 1110, it is determined that a valid separator exists, then in step 1112, the data points are split by the cutting plane, two new active partitions are created from the original partition, and process 1100 continues with step 1104. If, in step 1110, it is determined that no valid separators exist, then the process continues with step 1114, in which it is determined whether any ambiguous partitions exist. If, in step 1114, it is determined that no ambiguous partitions exist, then process 1100 exits. If, in step 1114, it is determined that an ambiguous partition does exist, then process 1100 continues with step 1116, in which it is determined whether any unseen data exists. If, in step 1116, it is determined that no unseen data exists, then process 1100 exits. If, in step 1116, it is determined that unseen data exists, then process 1100 continues with step 1118, in which the buffer is reloaded. This step takes place after all recursive partitioning on the current buffer is completed. If all existing partitions are marked as 'frozen' (there are no ambiguous partitions) and/or there are no more data points available (no unseen data), then process 1100 exits. Otherwise, if some partitions are marked as ambiguous and additional unseen data records exist, process 1100 reloads the data buffer. The new data replace records belonging to 'frozen' partitions. When new records are read in, only data points that fall inside ambiguous partitions are placed in the buffer. New records falling within a 'frozen' partition are not loaded into the buffer and are discarded. If it is desirable to maintain statistics of the data points falling inside partitions (including the 'frozen' partitions), such statistics can be continuously updated with the reading of each new record. Loading of new records continues until either: 1) the buffer is filled again; 2) the end of the data set is reached; or 3) a reasonable number of records (e.g., equal to the buffer size) have been read, even if the buffer is not full and there are more data. The reason for the last condition is that if the buffer is relatively large and there are many points marked for deletion, it may take a long time to entirely fill the buffer with data from the ambiguous regions. To avoid excessive reloading time under these circumstances, the buffer reloading process is terminated after reading through a number of records equal to the data buffer size. Once the buffer reload is completed, process 1100 continues with step 1104. Process 1100 requires, at most, a single pass through the entire data set.

The result of the process 1100 is a tree structure where each node is defined by intervals along every dimension. The histograms within each interval describe the observed distribution.

Summarization

The summarization process is accomplished by building a tree to summarize density of data in the data table. This may be done using any clustering or tree building modeling algorithm, such as the standard O-Cluster process 1000. The tree is built in two stages:

a. Hierarchically cluster the data, from the top-down, to identify regions of high density. These regions are mapped to the leaves of the tree.

b. If the number of leaves in the tree created in step a is smaller than the required number of summary points then, for each leaf generated in the step a, further subdivide the leaf by constructing subtrees in order to achieve one of the following goals:
   i) Create a subtree with equi-density leaves.
   ii) Mininize the overall variance or entropy of the subtree.
   iii) Balance the two goals above.

For each of the leaves of the subtrees a summary is created. The summary information about the data in a leaf is computed based on statistical properties (e.g., mean) for the data in the corresponding subtree leaf.

When the O-Cluster module is called in summarization mode, it is expected to produce summarized points ('fat' points) that would be used by the K-Means algorithm. A 'fat' point is a data point that is used to replace a collection of original similar data points. It has a count, which indicates the number of points it is replacing or summarizing. Clustering algorithms weight the contribution of each 'fat' point on the basis of the magnitude of this count. The number of 'fat' points is passed as the maximum number of clusters parameter. O-Cluster builds a subtree to minimize the variance/entropy within a frozen area. The subtree is grown in an unbalanced manner favoring partitions with larger number of points. In order to produce the required number of 'fat' points, O-Cluster further partitions the non-splittable/frozen, areas. The number of 'fat' points produced in a given frozen area is proportional to the fraction of the buffer associated with that area. A process for summarization mode includes the following steps:

1. Load buffer and follow the standard O-Cluster process 1000. Exit if the number of leaves becomes equal to the number of 'fat' points.

2. If more data needs to be loaded into the buffer and the required number of 'fat' points has not been reached, compute what fraction of the 'fat' points should be proportionally allocated to each frozen partition.

3. For each frozen partition build a subtree. The subtree is created by partitioning along an attribute. If all attributes are numeric then the attribute with the highest variance is selected. For data with categorical or a mix of numeric and categorical attributes, the attribute with the highest entropy is selected. The splitting point is located in the middle of the range of populated bins. The leaf node to be split is chosen on the basis of a criterion weighting the variance of the splitting attribute and the number of points belonging to the leaf. The subtree is grown until the required number of leaves ('fat' points) is produced or each leaf becomes a single data point.

The O-Cluster model is persisted in two tables in the database. Extra information for rules and Naïve Bayes model are also stored in three tables. O-Cluster in summarization mode returns an array of objects from which the 'fat' points are extracted in the K-Means module.

O-Cluster uses the Naïve Bayes apply modules.

Rule Generation Module

Description

This module extracts, for a group of clusters, a set of rules from the information in the histograms of the clusters. The rule set data is stored in a single table. This module is called from the Java stored procedure build function after all the clusters have been identified.

Processing

Figure 12:
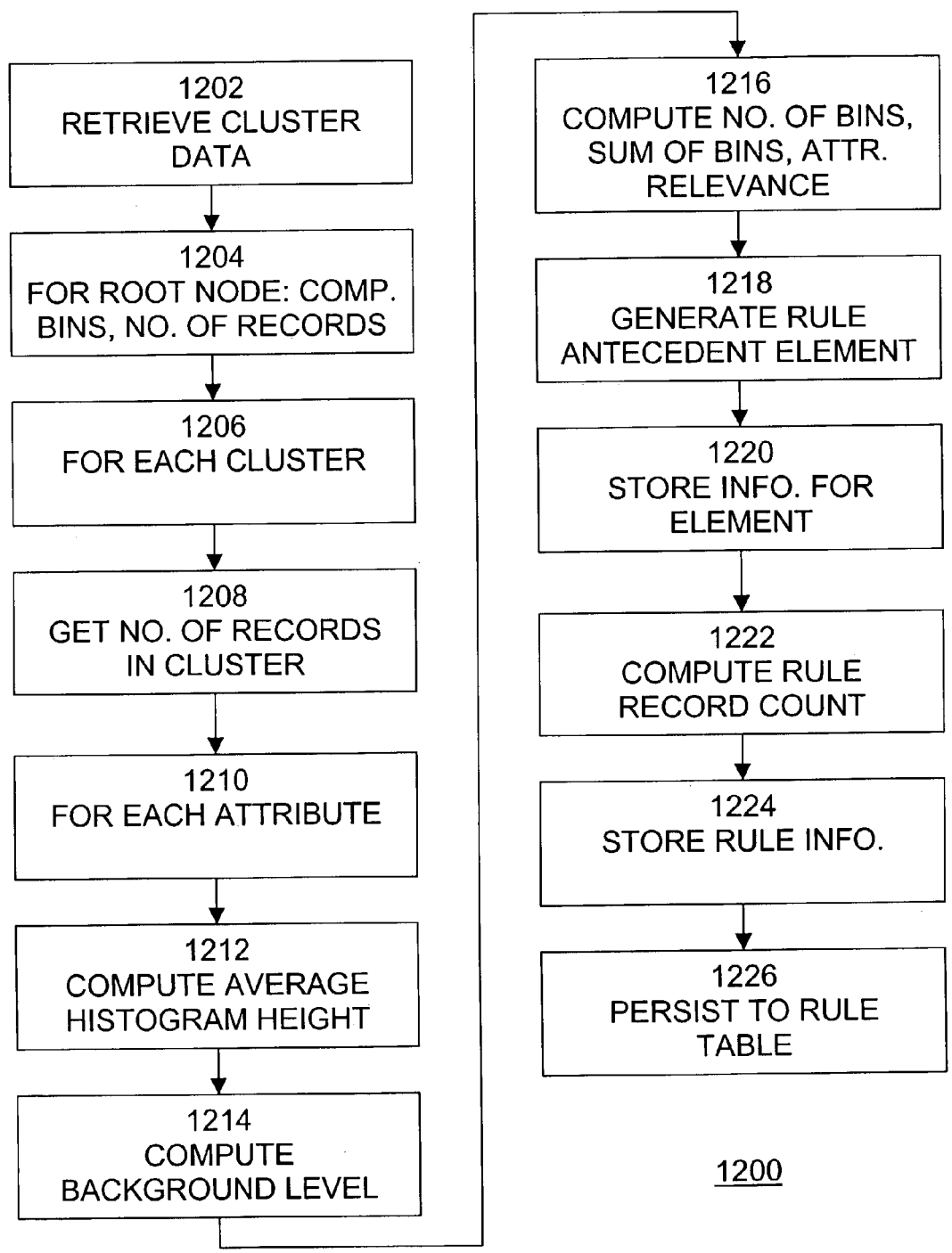
FIG. 12 is an exemplary flow diagram illustrating a rule generation process.

An exemplary flow diagram of a rule generation process 1200 is shown in FIG. 12. Process 1200 begins with step 1202, in which the cluster data is retrieved from the cluster table. In step 1204, for the root node, the number of non-zero bins for each attribute histogram is computed and the number of records in the root cluster is obtained. In step 1206, for each cluster, steps 1208 to 1224 are performed. In step 1208, the number of records Cc assigned to the cluster is obtained.

In step 1210, for each attribute A and associated attribute histogram of each cluster, steps 1212 to 1220 are performed. In step 1212, the average histogram height is computed for the non-zero bins H=Hs/B where B is the number of non-zero bins and Hs is the sum of the heights for the non-zero bins. In step 1214, the background level for the attribute histogram is computed as:

$$\beta = \begin{cases} 1-s & B=0 \\ \dfrac{(1-s)\max\left(1, H - \sqrt{H-\chi^2}\right)}{Cc} & B>0 \end{cases}$$

where s is the sensitivity parameter.

In step 1216, the number of bins Bp with height above β is computed. In addition, the sum of bins Hp with height above β is computed and the attribute relevance AR is computed as:

$$AR = \begin{cases} 0 & Br=0 \\ 1 - \dfrac{Bp}{Br} & Br>0 \end{cases}$$

where Br is the number of non-zero bins in the root node's histogram or this attribute.

In step 1218, the rule antecedent element (predicate) for the attribute is generated. If the attribute is categorical, then the predicate contains a list of all bins with height above β. For example, for a given cluster, a categorical attribute A with bins bin1, bin3, and bin4 above β would generate the following antecedent predicate: A IN (bin1, bin3, bin4). Otherwise, the predicate contains simple predicates encoding the range of the bins with height above β. For example, for a given cluster, a numerical attribute A with bins in the bin1 to bin2 range above β would generate the following antecedent predicate: A>bin1 AND A<=bin3.

In step 1220, the information for this attribute is stored. In step 1222, the rule record count Cr is computed as: (the minimum Hp for all attributes)*Cc. In step 1224, the rule information is stored. In step 1226, all cluster_rule objects are persisted to the named rule table.

Probabilistic Model Generation Module

Description

This module extracts, for a group of clusters, a Naïve Bayes model from the information in the histograms of the clusters. The Naïve Bayes model data is persisted in two tables: the prior probability table and the rules (or conditional probability) table. This module is called from the Java stored procedure build function after all the clusters have been identified.

Processing

Figure 13:
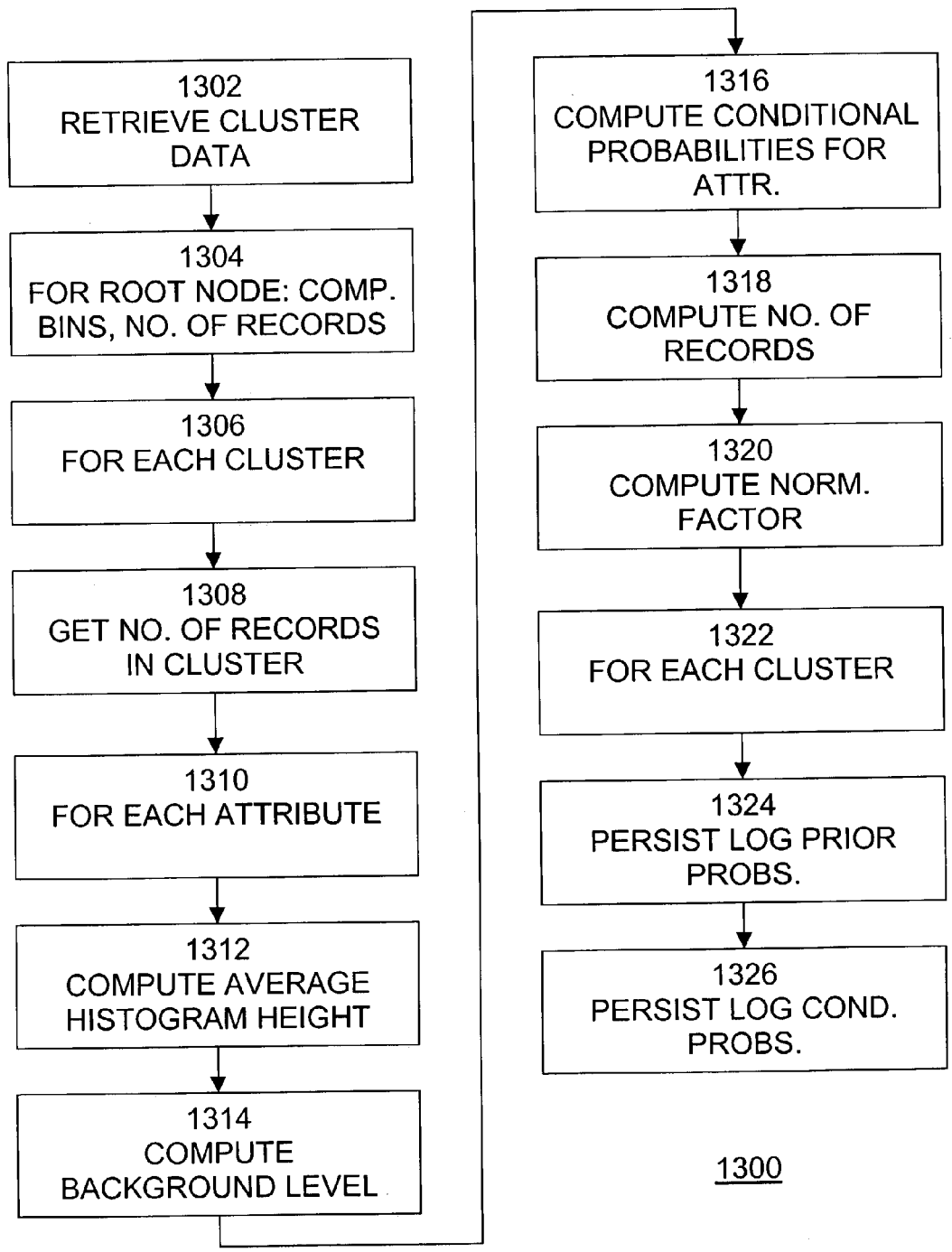
FIG. 13 is an exemplary flow diagram illustrating a probabilistic model generation process.

An exemplary flow diagram of a probabilistic model generation process 1300 is shown in FIG. 13. Process 1300 begins with step 1302, in which the cluster data is retrieved from the cluster table. In step 1304, for the root node, the number of non-zero bins for each attribute histogram is computed and the number of records in the root cluster is obtained. In step 1306, for each cluster, steps 1308 to 1318 are performed. In step 1308, the number of records Cc assigned to the cluster is obtained.

In step 1310, for each attribute A and associated attribute histogram of each cluster, steps 1312 to 1316 are performed. In step 1312, the average histogram height is computed for the non-zero bins H=Hs/B where B is the number of non-zero bins and Hs is the sum of the heights for the non-zero bins.

In step 1314, the background level for the attribute histogram is computed as:

$$\beta = \begin{cases} 1-s & B=0 \\ \dfrac{(1-s)\max\left(1, H - \sqrt{H-\chi^2}\right)}{Cc} & B>0 \end{cases}$$

where s is the sensitivity parameter.

In step 1314, the conditional probabilities for the attribute are computed. If the attribute is categorical, then the process uses multinomial distribution. To compute a multinomial distribution, the sum of bins Hp with height above β is computed. For each bin, if the bin height Hb is above a pre-defined small threshold (e.g., 10E–100), then Pc=max (ln(Hb/Hp)+k where Pc is the log conditional probability, and the constant k is used to make it compatible with the Naïve Bayes implementation. Otherwise, Pc=threshold value (e.g., –100 ln(10)).

If the attribute is not categorical, then the process uses a Gaussian distribution. To compute using a Gaussian distribution, the mean μ and the variance o² of the bin numbers for the bins with height above β is computed. For each bin the log conditional probability is computed as:

$$Pc = \begin{cases} \ln\left(\dfrac{1}{\sqrt{2\pi\sigma}}\exp\left(\dfrac{-(b-\mu)^2}{\sigma^2}\right)+k\right) & Hb \geq \theta \\ \ln(\theta) & Hb < 0 \end{cases}$$

where b is the bin number of a bin, Hb is the bin height, and T is a small threshold (e.g., 1E–100).

In step 1318, the number of records to be used for the cluster prior Cr is computed as (the minimum Hp for all attributes)*Cc. In step 1320, the prior normalization factor Ct is computed as the sum of the Cr for all clusters. In step 1322, for each cluster, the log prior Pp for those clusters where Cr>θ is computed as:

$$Pp = \ln\left(\dfrac{Cr}{Ct}\right)$$

In step 1324, the process persists the log prior probabilities to a prior probability table. In step 1326, the process persists the log conditional probabilities to a conditional probability table.

Exemplary Data Mining System

Figure 14:
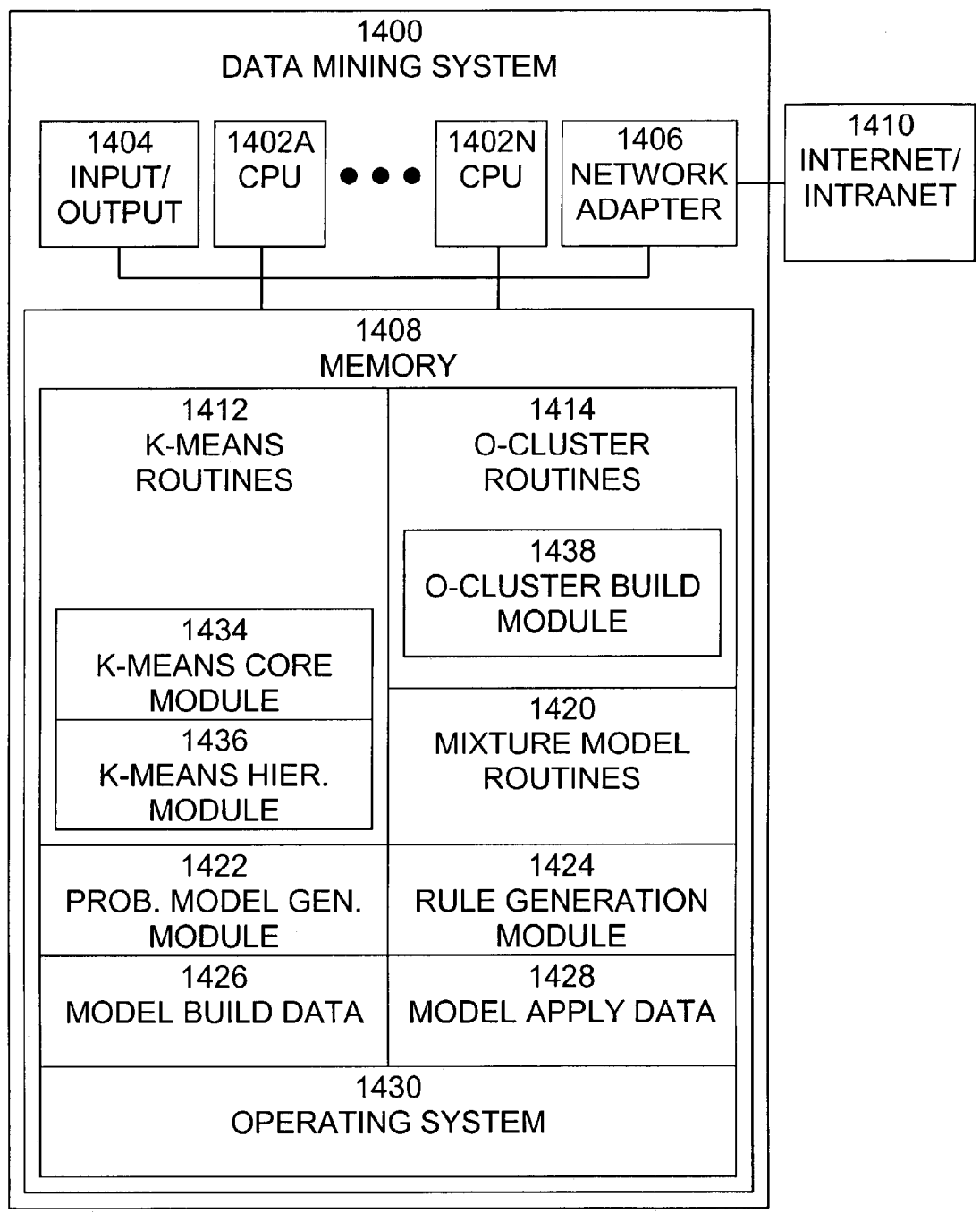
FIG. 14 is an exemplary block diagram of a data mining system, in which the present invention may be implemented.

An exemplary block diagram of a data mining system 1400, in which the present invention may be implemented, is shown in FIG. 14. Data mining system 1400 is typically a programmed general-purpose computer system, such as a personal computer, workstation, server system, and minicomputer or mainframe computer. Data mining system 1400 includes one or more processors (CPUs) 1402A–1402N, input/output circuitry 1404, network adapter 1406, and memory 1408. CPUs 1402A–1402N execute program instructions in order to carry out the functions of the present invention. Typically, CPUs 1402A–1402N are one or more microprocessors, such as an INTEL PENTIUM® processor. FIG. 14 illustrates an embodiment in which data mining system 1400 is implemented as a single multi-processor computer system, in which multiple processors 1402A–1402N share system resources, such as memory 1408, input/output circuitry 1404, and network adapter 1406. However, the present invention also contemplates embodiments in which data mining system 1400 is implemented as a plurality of networked computer systems, which may be single-processor computer systems, multi-processor computer systems, or a mix thereof.

Input/output circuitry 1404 provides the capability to input data to, or output data from, data mining system 1400. For example, input/output circuitry may include input devices, such as keyboards, mice, touchpads, trackballs, scanners, etc., output devices, such as video adapters, monitors, printers, etc., and input/output devices, such as, modems, etc. Network adapter 1406 interfaces data mining system 1400 with Internet/intranet 1410. Internet/intranet 1410 may include one or more standard local area network (LAN) or wide area network (WAN), such as Ethernet, Token Ring, the Internet, or a private or proprietary LAN/WAN.

Memory 1408 stores program instructions that are executed by, and data that are used and processed by, CPU 1402 to perform the functions of data mining system 1400. Memory 1408 may include electronic memory devices, such as random-access memory (RAM), read-only memory (ROM), programmable read-only memory (PROM), electrically erasable programmable read-only memory (EEPROM), flash memory, etc., and electromechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

In the example shown in FIG. 14, memory 1408 includes K-means routines 1412, O-Cluster routines 1414, mixture model routines 1420, probabilistic model generation module 1422, rule generation module 1424, model build data 1426, model apply data 1428, and operating system 1430. K-means routines 1412 include software modules to generate a clustering model using the K-means clustering process. K-means routines 1412 include, K-means core module 1434, and K-means hierarchical module 1436. K-means core module 1434 builds a center-based clustering model using the K-Means process. K-means hierarchical module 1436 builds a binary tree of clusters using K-means core module 1434.

O-Cluster routines 1414 includes software modules to generate a clustering model using the O-Cluster clustering process. O-Cluster routines 1414 include O-Cluster build module 1438. O-Cluster build module 1438 creates a hierarchical grid-based clustering model using the O-Cluster clustering process.

Mixture model routines 1420 include software modules to generate a clustering model using the mixture model clustering process. Mixture models attempt to approximate an input density with a fixed number of components density distributions. Probabilistic model generation module 1422 extracts, for a group of clusters, a Naïve Bayes model and a set of rules from the information in the histograms of the clusters. Rule generation module 1424 extracts, for a group of clusters, a set of rules from the information in the histograms of the clusters. Model build data 1426 includes data that is used in the model build process. Model apply data 1428 includes data that is used in the model apply process. Operating system 1430 provides overall system functionality.

As shown in FIG. 14, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, OS/2®, and WINDOWS®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

A preferred implementation of a data mining system including the clustering techniques described above involves the use of the JAVA® programming language.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A database management system for in-database clustering, comprising:
a first data table and a second data table stored in a memory, each data table including a plurality of rows of data;
processor means for building an Orthogonal Partitioning Clustering model using the first data table comprising:
means for computing histograms for active partitions,
means for determining, for each active partition, whether a splitting point exists and if so, splitting the active partition at the splitting point, comprising means for examining, for each active partition, groups of attributes and selecting a splitting plane at a valley, which is a bin of low density in the histogram, between two peaks, which are bins of high density and wherein a difference between peak and valley histogram counts are statistically significant,
means for determining whether any ambiguous partitions exist, and
means for determining whether any unseen data exists; and
processor means for applying the Orthogonal Partitioning Clustering model using the second data table to generate apply-output data.

2. The database management system of claim 1, wherein the means for building an Orthogonal Partitioning Clustering model comprises:
means for generating a hierarchical grid-based clustering model.

3. The database management system of claim 2, further comprising means for loading data to be processed into a buffer.

4. The database management system of claim 3, wherein the means for loading data to be processed into a buffer comprises:
means for loading a random sample of the data to be process into the buffer, if the data does not all fit into the buffer.

5. The database management system of claim 4, wherein the means for computing histograms for active partitions comprises:
means for computing histograms along unidimensional projections for each active partition.

6. The database management system of claim 5, wherein the statistical significance is determined according to:

$$\chi^2 = 2(\text{observed} - \text{expected})^2 \div \text{expected} \geq \chi_{\alpha,1}^2,$$

where the observed value is equal to the histogram count of the valley and the expected value is the average of the histogram counts of the valley and the lower peak.

7. The database management system of claim 6, wherein the means for determining whether any ambiguous partitions exist comprises:
means for determining, for each active partition for which no splitting point exists, whether a splitting point would have existed at a lower confidence level of statistical significance.

8. The database management system of claim 7, further comprising means for determining frozen partitions, wherein a frozen partition is a partition with no splitting point and which is not ambiguous.

9. The database management system of claim 8, wherein the means for loading data to be processed into a buffer comprises:
means for identifying data in the buffer that belongs to a frozen partition;
means for actively sampling the first data table to identify data to be loaded into the buffer; and
means for replacing the data in the buffer that belongs to the frozen partition with the identified data to be loaded into the buffer.

10. The database management system of claim 9, wherein the means for actively sampling the first data table to identify data to be loaded into the buffer comprises:
means for determining an area of the model that would be improved by additional training based corresponding to the ambiguous partition.

11. The database management system of claim 5, wherein the means for examining attributes and selecting a splitting plane comprises:
means for selecting two largest bins in the histogram and for selecting a splitting plane between the two largest bins.

12. The database management system of claim 11, further comprising means for determining frozen partitions, wherein a frozen partition is a partition with no splitting point and which is not ambiguous.

13. The database management system of claim 12, wherein the means for loading data to be processed into a buffer comprises:
means for identifying data in the buffer that belongs to a frozen partition;
means for actively sampling the first data table to identify data to be loaded into the buffer; and
means for replacing the data in the buffer that belongs to the frozen partition with the identified data to be loaded into the buffer.

14. The database management system of claim 13, wherein the means for actively sampling the first data table to identify data to be loaded into the buffer comprises:
means for determining an area of the model that would be improved by additional training based corresponding to the ambiguous partition.

15. A method for in-database clustering in a database management system, comprising the steps of:
receiving a first data table and a second data table, each data table including a plurality of rows of data;
building an Orthogonal Partitioning Clustering model using the first data table comprising:
computing histograms for active partitions,
determining, for each active partition, whether a splitting point exists and if so, splitting the active partition at the splitting point, comprising means for examining, for each active partition, groups of attributes and selecting a splitting plane at a valley, which is a bin of low density in the histogram, between two peaks, which are bins of high density and wherein a difference between peak and valley histogram counts are statistically significant,
determining whether any ambiguous partitions exist, and
determining whether any unseen data exists; and
applying the Orthogonal Partitioning Clustering model using the second data table to generate apply-output data.

16. The method of claim 15, wherein the step of building an Orthogonal Partitioning Clustering model comprises the step of:
generating a hierarchical grid-based clustering model.

17. The method of claim 16, further comprising the step of:
loading data to be processed into a buffer.

18. The method of claim 17, wherein the step of loading data to be processed into a buffer comprises the step of:
loading a random sample of the data to be process into the buffer, if the data does not all fit into the buffer.

19. The method of claim 18, wherein the step of computing histograms for active partitions comprises the step of:
computing histograms along unidimensional projections for each active partition.

20. The method of claim 19, wherein the statistical significance is determined according to:

$$\chi^2 = 2(\text{observed}-\text{expected})^2 \div \text{expected} \geq \chi_{\alpha,1}^2,$$

where the observed value is equal to the histogram count of the valley and the expected value is the average of the histogram counts of the valley and the lower peak.

21. The method of claim 20, wherein the step of determining whether any ambiguous partitions exist comprises the step of:
determining, for each active partition for which no splitting point exists, whether a splitting point would have existed at a lower confidence level of statistical significance.

22. The method of claim 21, further comprising the step of:
determining frozen partitions, wherein a frozen partition is a partition with no splitting point and which is not ambiguous.

23. The method of claim 22, wherein the step of loading data to be processed into a buffer comprises the step of:
identifying data in the buffer that belongs to a frozen partition;
actively sampling the first data table to identify data to be loaded into the buffer; and
replacing the data in the buffer that belongs to the frozen partition with the identified data to be loaded into the buffer.

24. The method of claim 23, wherein the step of actively sampling the first data table to identify data to be loaded into the buffer comprises the step of:
determining an area of the model that would be improved by additional training based corresponding to the ambiguous partition.

25. The method of claim 19, wherein the step of examining attributes and selecting a splitting plane comprises the step of:
selecting two largest bins in the histogram and for selecting a splitting plane between the two largest bins.

26. The method of claim 25, further comprising the step of:
determining frozen partitions, wherein a frozen partition is a partition with no splitting point and which is not ambiguous.

27. The method of claim 26, wherein the step of loading data to be processed into a buffer comprises the steps of:
identifying data in the buffer that belongs to a frozen partition;
actively sampling the first data table to identify data to be loaded into the buffer; and
replacing the data in the buffer that belongs to the frozen partition with the identified data to be loaded into the buffer.

28. The method of claim 27, wherein the step of actively sampling the first data table to identify data to be loaded into the buffer comprises the step of:
determining an area of the model that would be improved by additional training based corresponding to the ambiguous partition.

29. A system for in-database clustering in a database management system, comprising:
a processor operable to execute computer program instructions;
a memory operable to store computer program instructions executable by the processor; and
computer program instructions stored in the memory and executable to perform the steps of:
receiving a first data table and a second data table, each data table including a plurality of rows of data;
building an Orthogonal Partitioning Clustering model using the first data table comprising:
computing histograms for active partitions,
determining, for each active partition, whether a splitting point exists and if so, splitting the active partition at the splitting point, comprising means for examining, for each active partition, groups of attributes and selecting a splitting plane at a valley, which is a bin of low density in the histogram, between two peaks, which are bins of high density and wherein a difference between peak and valley histogram counts are statistically significant,
determining whether any ambiguous partitions exist, and
determining whether any unseen data exists; and
applying the Orthogonal Partitioning Clustering model using the second data table to generate apply-output data.

30. The system of claim 29, wherein the step of building an Orthogonal Partitioning Clustering model comprises the step of:
generating a hierarchical grid-based clustering model.

31. The system of claim 30, further comprising the step of:
loading data to be processed into a buffer.

32. The system of claim 31, wherein the step of loading data to be processed into a buffer comprises the step of:
loading a random sample of the data to be process into the buffer, if the data does not all fit into the buffer.

33. The system of claim 32, wherein the step of computing histograms for active partitions comprises the step of:
computing histograms along unidimensional projections for each active partition.

34. The system of claim 33, wherein the statistical significance is determined according to:

$$\chi^2 = 2(\text{observed}-\text{expected})^2 \div \text{expected} \geq \chi_{\alpha,1}^2,$$

where the observed value is equal to the histogram count of the valley and the expected value is the average of the histogram counts of the valley and the lower peak.

35. The system of claim 34, wherein the step of determining whether any ambiguous partitions exist comprises the step of:
determining, for each active partition for which no splitting point exists, whether a splitting point would have existed at a lower confidence level of statistical significance.

36. The system of claim 35, further comprising the step of:
determining frozen partitions, wherein a frozen partition is a partition with no splitting point and which is not ambiguous.

37. The system of claim 36, wherein the step of loading data to be processed into a buffer comprises the step of:
identifying data in the buffer that belongs to a frozen partition;
actively sampling the first data table to identify data to be loaded into the buffer; and
replacing the data in the buffer that belongs to the frozen partition with the identified data to be loaded into the buffer.

38. The system of claim 37, wherein the step of actively sampling the first data table to identify data to be loaded into the buffer comprises the step of:
determining an area of the model that would be improved by additional training based corresponding to the ambiguous partition.

39. The system of claim 33, wherein the step of examining attributes and selecting a splitting plane comprises the step of:
selecting two largest bins in the histogram and for selecting a splitting plane between the two largest bins.

40. The system of claim 39, further comprising the step of:
determining frozen partitions, wherein a frozen partition is a partition with no splitting point and which is not ambiguous.

41. The system of claim 40, wherein the step of loading data to be processed into a buffer comprises the steps of:
identifying data in the buffer that belongs to a frozen partition;
actively sampling the first data table to identify data to be loaded into the buffer; and
replacing the data in the buffer that belongs to the frozen partition with the identified data to be loaded into the buffer.

42. The system of claim 41, wherein the step of actively sampling the first data table to identify data to be loaded into the buffer comprises the step of:
determining an area of the model that would be improved by additional training based corresponding to the ambiguous partition.

43. A computer program product for in-database clustering in a database management system comprising:
a computer readable storage medium;
computer program instructions, recorded on the computer readable storage medium, executable by a processor, for performing the steps of
receiving a first data table and a second data table, each data table including a plurality of rows of data;
building an Orthogonal Partitioning Clustering model using the first data table comprising:
computing histograms for active partitions,
determining, for each active partition, whether a splitting point exists and if so, splitting the active partition at the splitting point, comprising means for examining, for each active partition, groups of attributes and selecting a splitting plane at a valley, which is a bin of low density in the histogram, between two peaks, which are bins of high density and wherein a difference between peak and valley histogram counts are statistically significant,
determining whether any ambiguous partitions exist, and
determining whether any unseen data exists; and
applying the Orthogonal Partitioning Clustering model using the second data table to generate apply-output data.

44. The computer program product of claim 43, wherein the step of building an Orthogonal Partitioning Clustering model comprises the step of:
generating a hierarchical grid-based clustering model.

45. The computer program product of claim 44, further comprising the step of:
loading data to be processed into a buffer.

46. The computer program product of claim 45, wherein the step of loading data to be processed into a buffer comprises the step of:
loading a random sample of the data to be process into the buffer, if the data does not all fit into the buffer.

47. The computer program product of claim 46, wherein the step of computing histograms for active partitions comprises the step of:
computing histograms along unidimensional projections for each active partition.

48. The computer program product of claim 47, wherein the statistical significance is determined according to:

$$\chi^2 = 2(observed - expected)^2 \div expected \geq \chi_{\alpha,1}^2,$$

where the observed value is equal to the histogram count of the valley and the expected value is the average of the histogram counts of the valley and the lower peak.

49. The computer program product of claim 48, wherein the step of determining whether any ambiguous partitions exist comprises the step of:
determining, for each active partition for which no splitting point exists, whether a splitting point would have existed at a lower confidence level of statistical significance.

50. The computer program product of claim 49, further comprising the step of:
determining frozen partitions, wherein a frozen partition is a partition with no splitting point and which is not ambiguous.

51. The computer program product of claim 50, wherein the step of loading data to be processed into a buffer comprises the step of:
identifying data in the buffer that belongs to a frozen partition;
actively sampling the first data table to identify data to be loaded into the buffer; and
replacing the data in the buffer that belongs to the frozen partition with the identified data to be loaded into the buffer.

52. The computer program product of claim 51, wherein the step of actively sampling the first data table to identify data to be loaded into the buffer comprises the step of:
determining an area of the model that would be improved by additional training based corresponding to the ambiguous partition.

53. The computer program product of claim 47, wherein the step of examining attributes and selecting a splitting plane comprises the step of:
selecting two largest bins in the histogram and for selecting a splitting plane between the two largest bins.

54. The computer program product of claim 53, further comprising the step of:
determining frozen partitions, wherein a frozen partition is a partition with no splitting point and which is not ambiguous.

55. The computer program product of claim 54, wherein the step of loading data to be processed into a buffer comprises the steps of:
- identifying data in the buffer that belongs to a frozen partition;
- actively sampling the first data table to identify data to be loaded into the buffer; and
- replacing the data in the buffer that belongs to the frozen partition with the identified data to be loaded into the buffer.

56. The computer program product of claim 55, wherein the step of actively sampling the first data table to identify data to be loaded into the buffer comprises the step of:
- determining an area of the model that would be improved by additional training based corresponding to the ambiguous partition.

* * * * *